(12) United States Patent
Hiramoto et al.

(10) Patent No.: US 6,644,462 B2
(45) Date of Patent: Nov. 11, 2003

(54) CONVEYING APPARATUS AND ROTARY TYPE TRANSFER APPARATUS FOR SPOUT-EQUIPPED BAGS

(75) Inventors: Shinichi Hiramoto, Iwakuni (JP); Shoji Tsutsui, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 38 days.

(21) Appl. No.: 09/971,265

(22) Filed: Oct. 3, 2001

(65) Prior Publication Data

US 2002/0038756 A1 Apr. 4, 2002

(30) Foreign Application Priority Data

Oct. 4, 2000 (JP) ........................................ 2000-305427

(51) Int. Cl.[7] .............................................. B01B 19/84
(52) U.S. Cl. .................. 198/478.1; 198/459.2; 198/867.11; 198/803.14
(58) Field of Search .................. 198/459.2, 478.1, 198/867.11, 803.14, 377.1

(56) References Cited

U.S. PATENT DOCUMENTS

| | | | | |
|---|---|---|---|---|
| 4,563,935 A | * | 1/1986 | Rinck et al. .................. 86/17 |
| 5,074,397 A | * | 12/1991 | Mukai et al. ............. 198/343.1 |
| 6,029,795 A | * | 2/2000 | Janssen et al. ........... 198/465.4 |

FOREIGN PATENT DOCUMENTS

| | | | |
|---|---|---|---|
| EP | 1195240 A2 | * 4/2002 | ........... B31B/19/84 |
| JP | 2500557 | 3/1996 | |
| JP | H11-124213 | 5/1999 | |
| JP | H11-208884 | 8/1999 | |
| JP | H11-263302 | 9/1999 | |

* cited by examiner

Primary Examiner—Joseph E. Valenza
Assistant Examiner—Mark A. Deuble
(74) Attorney, Agent, or Firm—Koda & Androlia

(57) ABSTRACT

A rotary type transfer apparatus used in a continuous manufacturing apparatus for spout-equipped bags. The transfer apparatus includes a transfer rotor and a driving device and installed next to an extraction apparatus. The transfer rotor has spout holding members on its circumference, and the driving device causes the transfer rotor to rotate intermittently in a cycle of stopping, acceleration, constant-speed rotation, deceleration and stopping and causes the speed of the spout holding members of the transfer apparatus to coincide with the speed of the spout holding members of the extraction apparatus during the period of constant rotation and causes the spout holding members to run side by side. During the constant-speed rotation, spouts are transferred from the spout holding members of the continuously rotating extraction apparatus to the spout holding members of the rotary type transfer apparatus via a guide member.

10 Claims, 16 Drawing Sheets

CONVEYING APPARATUS AND ROTARY TYPE TRANSFER APPARATUS FOR SPOUT-EQUIPPED BAGS

BACKGROUND OF THE INVENTION

1. Field of the Invention

The present invention relates to a conveying apparatus and more particularly to a conveying apparatus for bags that have spouts attached thereto (hereinafter called "spout-equipped bags") and is installed on a downstream side of a continuous manufacturing apparatus for such bags, and the present invention further relates to a rotary type transfer apparatus that is especially suitable for such a conveying apparatus.

2. Prior Art

In prior art, spout-equipped bags are manufactured by, for instance, a rotary type continuous manufacturing apparatus for spout-equipped bags as disclosed in Japanese Patent Application Laid-Open (Kokai) Nos. 11-208884 and 11-124213.

After such spout-equipped bags are continuously extracted via an extraction rotor that is disposed in an adjacent position, the bags are transferred to conveying rails (by way of, for instance, allowing the grooves located between flanges formed on the spouts to be inserted between the rails), the bags are sent "as is" in a single row along the conveying rails toward a liquid substance filling device (as disclosed in, for instance, Japanese Patent Application Laid-Open (Kokai) No. 11-124213). In another method, after the bags are arranged and accommodated on rail-form accommodating members from the conveying rails, they are supplied to a liquid substance filling device while being accommodated on the accommodating members (as disclosed in, for instance, Japanese Patent Application Laid-Open (Kokai) No. 11-263302 and Japanese Patent No. 2500557 (Laid-Open No. H05-170252)).

In the above prior art, spout-equipped bags which are held on the circumference of a continuously rotating extraction rotor must be transferred to conveying rails that are in a stationary state. Since this transfer must be performed at the instant at which the spout-equipped bags reach the position of the conveying rails, the transfer process abruptly becomes unstable in cases where the processing speed (units/minute) of the transfer operation is increased, resulting in numerous transfer errors (bag insertion failure, etc.). Thus, though the rotary type continuous manufacturing apparatus and extraction rotor of the above-described types are used for the purpose of increasing the productivity of spout-equipped bags, stable high-speed processing cannot be accomplished.

Furthermore, troubles would occur in the process line on the downstream side of the extraction rotor. Such troubles include a case where a transfer error in the transfer from the extraction rotor to the conveying rails occurs, a case where the conveying rails malfunctions, a case where some type of trouble occurs in the device that arranges and accommodates the spout-equipped bags on the rail-form accommodating members, and a case where a filling device is connected to the downstream side of the conveying rails and this filling device is stopped. When such troubles occur, the continuous manufacturing apparatus for spout-equipped bags is immediately stopped, and the trouble area is inspected and repaired. However, when the continuous manufacturing apparatus for spout-equipped bags is stopped, the sealing treatment of the spouts and bags under process inside the apparatus becomes defective; in addition, the spouts and bags held in the stopped sealing apparatus are melted as a result of the heat, and the fusion of plastic to the sealing apparatus, etc. occurs.

SUMMARY OF THE INVENTION

The present invention is to solve the above-described problems with the prior art.

One object of the present invention is to allow stable high-speed processing with respect to the transfer of the spouts from the extraction rotor to the conveying rails.

Another object of the present invention is to prevent the occurrence of defective sealing and the fusion of plastic to the sealing apparatus, etc., even in cases where some type of trouble occurs on the downstream side of the extraction rotor.

The above objects are accomplished by a unique structure for a rotary type transfer apparatus for spout-equipped bags in which the spout-equipped bags are received from a plurality of first spout holding members which are disposed on a circumference of a working rotor that rotates continuously at a constant speed, and the spout-equipped bags are rotationally conveyed and transferred to a rail type conveying apparatus installed on a downstream side of the rotary type transfer apparatus; and in the present invention the rotary type transfer apparatus further comprises:

a transfer rotor which has a plurality of second spout holding members disposed on a circumference thereof, and a driving means which causes the transfer rotor to rotate intermittently a predetermined angle at a time in a fixed cycle of stopping, acceleration, constant speed, deceleration and stopping, the driving means causing speed of the second spout holding members during the constant-speed rotation to coincide with speed of the first spout holding members and causes the first and second spout holding members to run side by side, wherein the second spout holding members receive the spout-equipped bags from the first spout holding members during the constant-speed rotation, and the spout-equipped bags are transferred from the second spout holding members to a rail type conveying apparatus provided on a downstream side at a predetermined stopping position of the second spout holding members.

Here, the "working rotor" refers to a rotor which is installed adjacent to the rotary type transfer apparatus on the upstream side of the transfer apparatus; and it can be a rotor of a rotary type continuous manufacturing apparatus or an extraction rotor thereof.

In the above rotary type transfer apparatus for spout-equipped bags, a movement path of centers of spout holding positions of the second spout holding members and a movement path of centers of spout holding positions of the first spout holding members are provided so as to approach each other, the transfer rotor rotates at a constant speed while the second spout holding members pass near a position of the maximum proximity of the two movement paths, both of the first and second spout holding members are provided with holding grooves which are oriented radially outward and which hold grooves located between flanges formed on the spouts, and tapered surfaces that open outward are formed near entrance areas of the holding grooves; and in addition spouts of the bags which are held in the holding grooves of the first spout holding members are conveyed into the holding grooves of the second spout holding members while the transfer rotor rotates at a constant speed.

In the above structure, it is preferable to install a guide member that conveys the spout-equipped bags from the first spout holding members to the second spout holding members so that the guide member is disposed between the working rotor and the transfer rotor. The guide member is provided with a guide groove that is formed continuously from the movement path of the centers of the spout holding positions of the first spout holding members to the movement path of the centers of the spout holding positions of the second spout holding members; and head portions of the spouts are inserted into the guide groove and guided along the guide groove.

It is further preferable to install a push-out device which, above the holding grooves, pushes the spouts out of the holding grooves of the second spout holding members that are stopped at the stopping position by means of a pusher which advances and retracts in a radial direction of the transfer rotor, thus feeding the spouts out toward the rail type conveying apparatus. The push-out device is preferably provided with a safety mechanism which automatically stops a movement of the pusher toward outside in a radial direction of the transfer rotor when a resistance that exceeds a predetermined value is applied to the pusher during the above movement of the pusher toward the outside.

Furthermore, the conveying apparatus for spout-equipped bags of the present invention comprises the above-described rotary type transfer apparatus and a rail type conveying apparatus which is disposed on a downstream side of the rotary type transfer apparatus. The rail type conveying apparatus is comprised of a transfer rail device that is disposed on a furthest upstream side of the rail type conveying apparatus as a part of the rail type conveying apparatus, and this transfer rail device comprises:

transfer rails which are installed so as to be oriented radially outward from a predetermined stopping position of the second spout holding members and are used to receive spouts of spout-equipped bags from the holding grooves of the spout holding members stopped at the stopping position and to transfer the spouts to a following rail type conveying apparatus, and a driving means which moves the transfer rails from a position where the transfer rails are installed to a retracted position in which the rails do not receive spouts.

In the above conveying apparatus for spout-equipped bags, it is further preferable that the spout holding members of the transfer rotor and spout guides provided on the transfer rails are disposed at different heights, and grooves of the spouts that are held in the holding grooves of the spout holding members and grooves of the spouts into which the spout guides of the transfer rails are inserted are positioned at different heights in a vertical direction. In this case, it is necessary that a plurality of grooves at different levels in a vertical direction be formed in side surfaces of the spouts.

It is additionally preferable to design so that of the pair of spout guides of the transfer rails, a spout guide that is positioned on a front side with respect to a rotation of the transfer rotor extends to a position that overlaps with a movement path of centers of spout holding positions of the spout holding members of the transfer rotor, and the transfer rails are arranged so as to swing within a horizontal plane; and so that when spouts that are held by the spout holding members and moved come in contact with the transfer rails, the transfer rails swing horizontally and escape from the movement path.

Furthermore, in the above-described conveying apparatus for spout-equipped bags, a rotary type transfer apparatus that performs a predetermined intermittent rotational operation is combined with a transfer rail device, and this arrangement is taken based upon the structure in which a continuously rotating working rotor is present on the upstream side and spout-equipped bags are continuously received from this working rotor. However, this transfer rail device is not limited to a rotary type transfer apparatus that performs such a predetermined intermittent rotational operation. As long as the rotary type transfer apparatus is a rotary type transfer apparatus that is equipped with a transfer rotor in which a plurality of spout holding members that have radially oriented holding grooves that hold grooves located between flanges formed on the spouts are disposed on the circumference of the rotor and is equipped with a driving means which causes this transfer rotor to rotate intermittently a predetermined angle at a time, a conveying apparatus can be constructed in combination with this rotary type transfer apparatus

DETAILED DESCRIPTION OF THE PRESENT INVENTION

The rotary type transfer apparatus and conveying apparatus for spout-equipped bags (called "spout-equipped bags") provided by the present invention will be described in concrete terms with reference to FIGS. 1 through 16.

Figure 1:
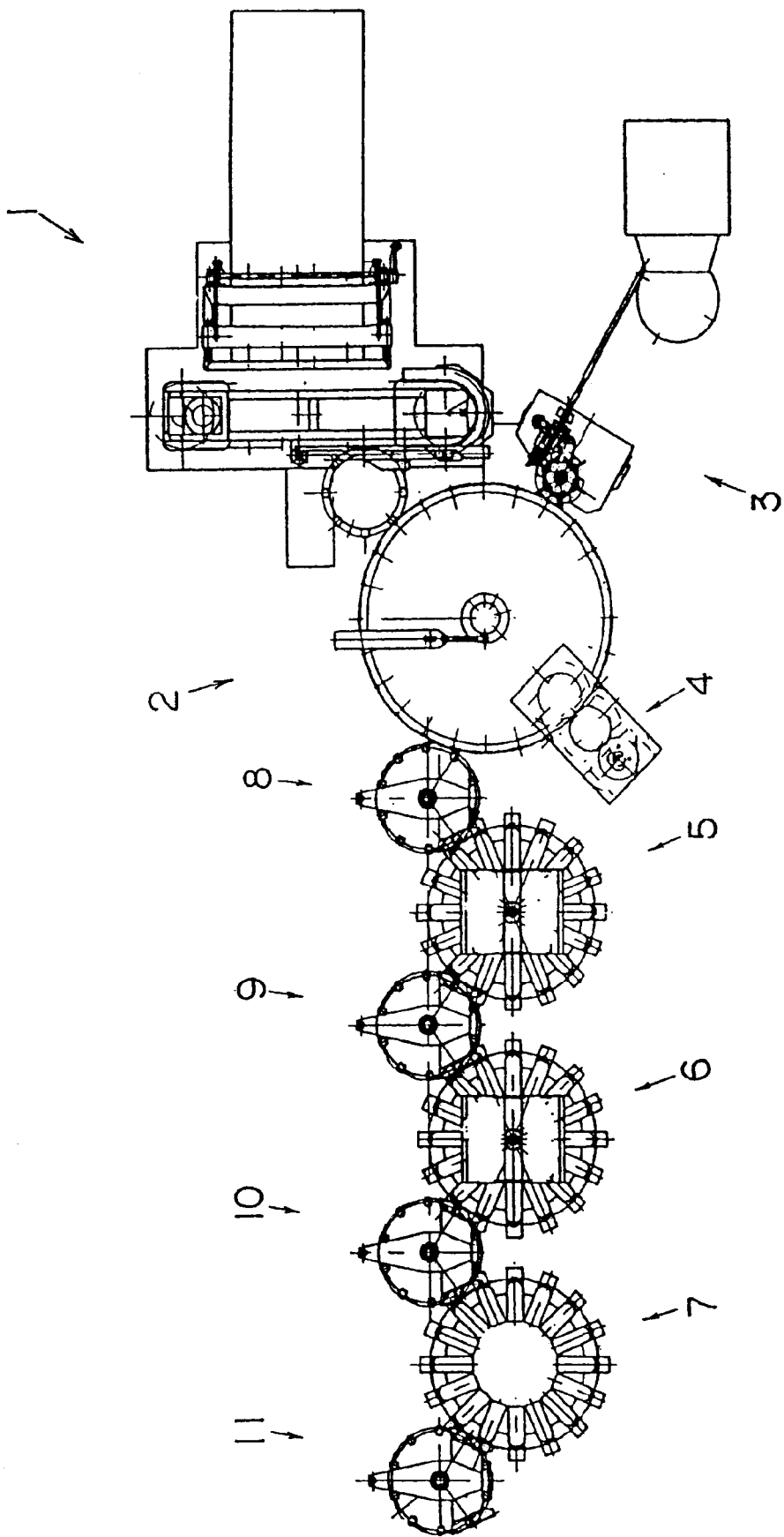
FIG. 1 is a top view of the continuous manufacturing apparatus for spout-equipped bags according to the present invention.

First, FIG. 1 shows one example of a continuous manufacturing apparatus for spout-equipped bags (for details, see Japanese Patent Application No. 2000-180633).

In this continuous manufacturing apparatus, bags are supplied to a spout insertion and temporary-sealing apparatus 2 from a continuous bag-supplying apparatus 1, and spouts are supplied to the spout insertion and temporary-sealing apparatus 2 from a spout-supplying apparatus 3. In the spout insertion and temporary-sealing apparatus 2, the spouts are inserted into the bags, and temporary sealing is performed on the sealing parts by a temporary-sealing apparatus 4, and the spouts and bags are connected.

On the downstream side of the spout insertion and temporary-sealing apparatus 2, a primary sealing apparatus 5, secondary sealing apparatus 6 and cold-sealing apparatus 7 are respectively installed in series with transfer devices 8 through 10 in between. An extraction apparatus 11 is installed at the end of this series of apparatuses. The spout insertion and temporary-sealing apparatus 2 and the respective apparatuses 5 through 11 are all equipped with continuously rotating rotors, and the spouts and bags are subjected to predetermined processing while being rotationally conveyed in a continuous manner.

Figure 2:
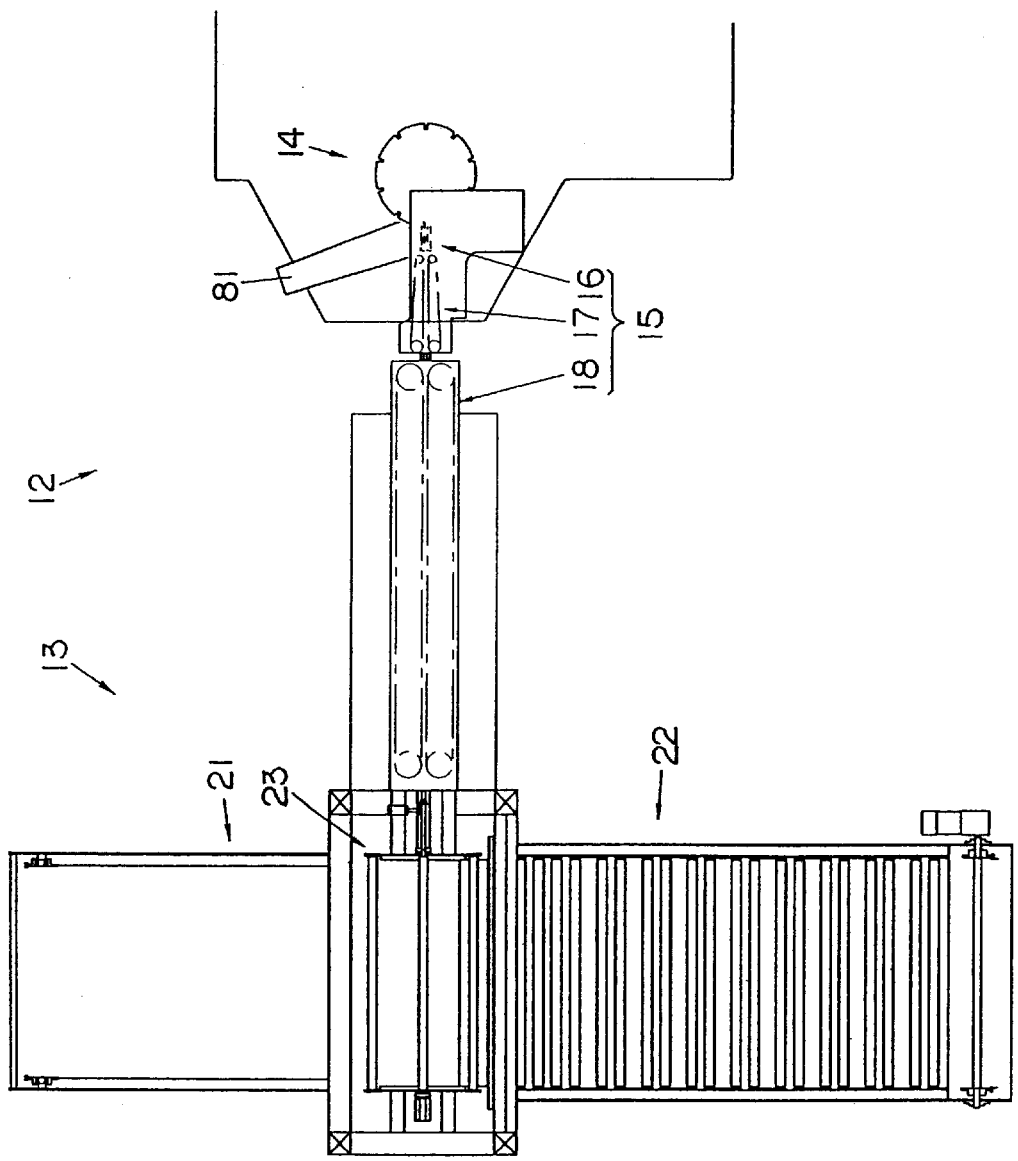
FIG. 2 is a top view of the conveying apparatus for spout-equipped bags and the accommodating apparatus for such bags.

FIG. 2 shows a conveying apparatus 12 for spout-equipped bags and an accommodating apparatus 13 for such bags. These apparatuses 12 and 13 are disposed on the downstream side of the extraction apparatus 11.

The conveying apparatus 12 is comprised of a rotary type transfer apparatus 14, which is disposed adjacent to the extraction apparatus 11, and a rail type conveying apparatus 15, which is disposed on the downstream side of the rotary type transfer apparatus 14. The rail type conveying apparatus 15 is comprised of a first rail device (transfer rail device) 16, a second rail device 17 and a third rail device 18.

The accommodating apparatus 13 for spout-equipped bags is comprised of an empty-accommodating-rail feed-in device 21, a full-accommodating-rail feed-out device 22, and an accommodating-rail raising-and-lowering device 23.

Figure 3:
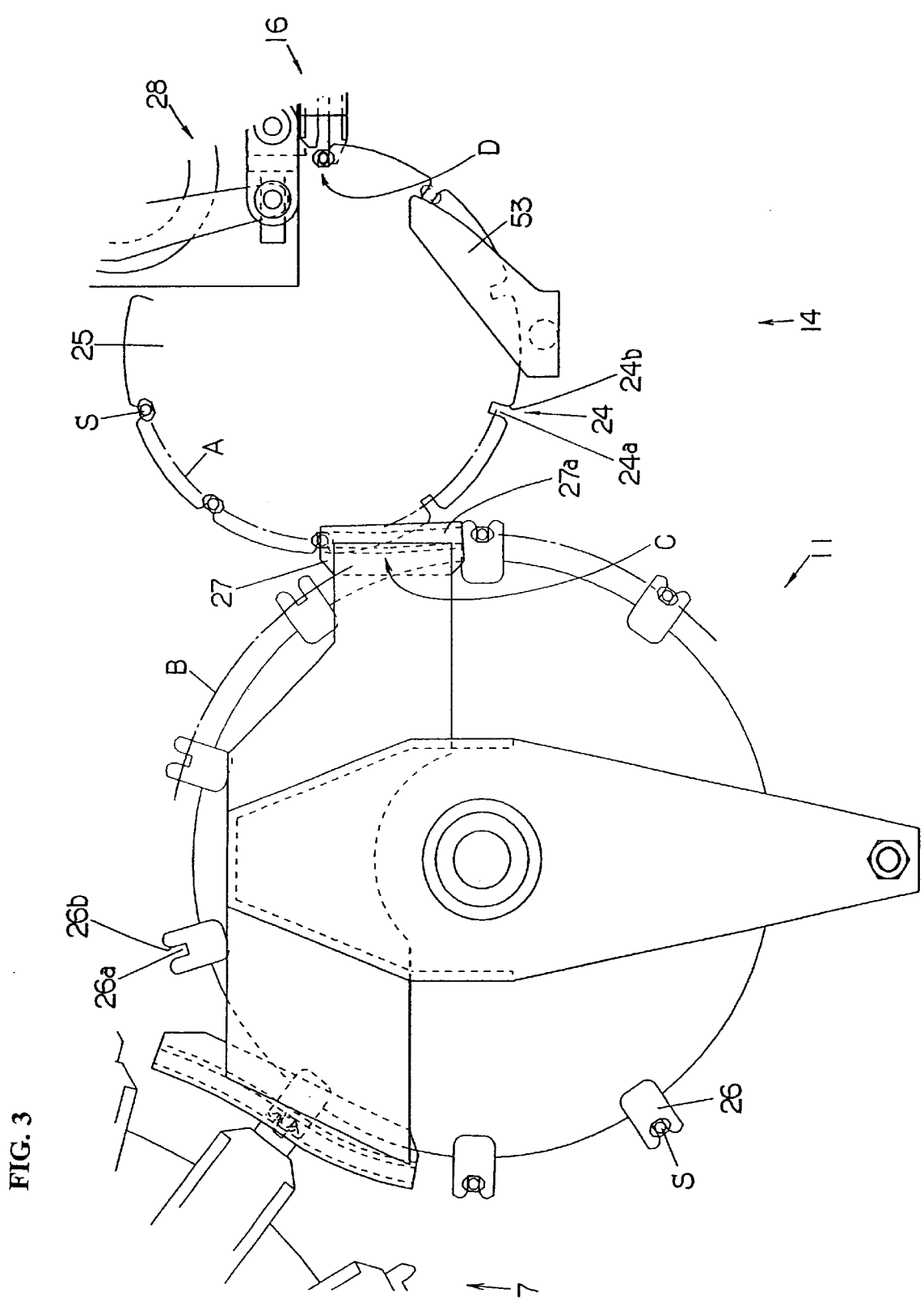
FIG. 3 is a top view of the rotary type transfer apparatus (with the transfer rotor stopped) and the extraction apparatus.

As shown in FIG. 3, the rotary type transfer apparatus 14 is comprised of a transfer rotor 25 and a driving means (not shown). The transfer rotor 25 has a plurality of spout holding members 24 disposed on the circumference thereof. The driving means causes the transfer rotor 25 to rotate intermittently a predetermined angle at a time (i.e., the angle between adjacent spout holding members 24) in a cycle that consists of stopping, acceleration, constant-speed rotation, deceleration and stopping.

It is designed so that the movement path A of the centers of spout holding positions of the spout holding members 24 and the movement path B of the centers of spout holding positions of spout holding members 26 of the extraction apparatus 11 approach each other.

The mechanism itself that starts the above-described cycle is universally known as an indexing device.

The time of one cycle of the spout holding members 24 is set by the above-described driving means so as to be equal to the time required for the spout holding members 26 to advance by one pitch (i.e., the angle between adjacent spout holding members 26). The transfer rotor 25 rotates at a constant speed while its spout holding members 24 pass through the vicinity of the position of closest proximity of the two movement paths A and B (i.e., the transfer position C). The spout holding members 24 and spout holding members 26 rotate at the same speed and run side by side during this constant-speed rotation.

The spout holding members 24 and 26 both have more or less parallel holding grooves 24a and 26a, which are oriented in the radial directions of the respective rotors, and tapered portions 24b and 26b, which open outward and are formed in the vicinity of the entrance areas of the holding grooves 24a and 26a. The spout holding members 24 are positioned so as to be at a different height from the spout holding members 26. Thus, though the paths A and B of the two sets of spout holding members partially overlap (to the extent that the tapered portions 24b and 26bof the two sets of spout holding members overlap) when viewed from above as shown in FIG. 3, the spout holding members do not interfere with each other (see FIG. 5).

Figure 6A:
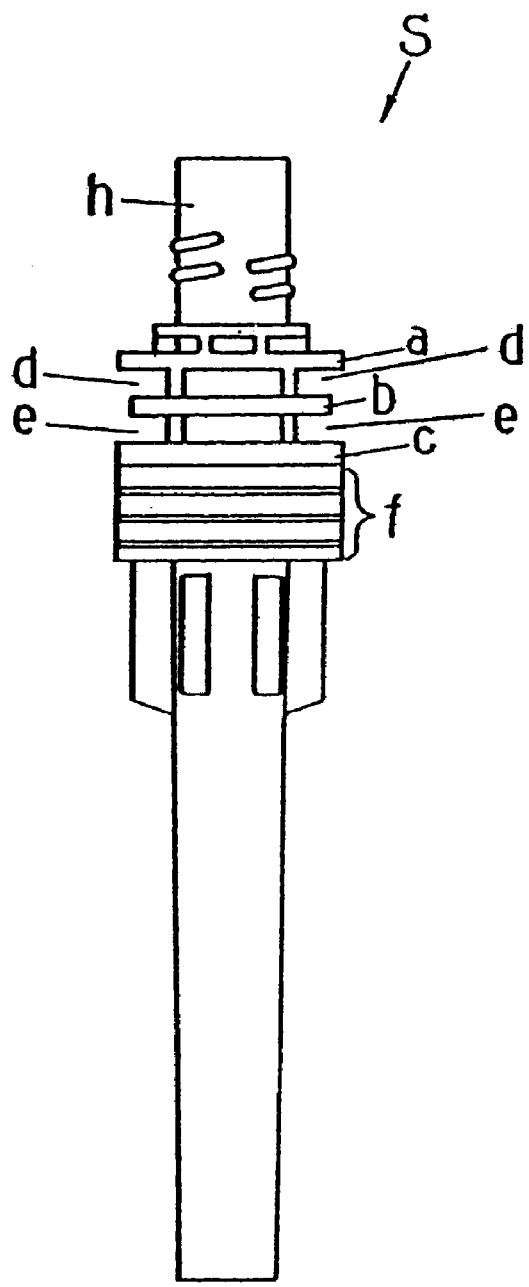
FIG. 6A is a front view of one of the spouts.
Figure 6B:
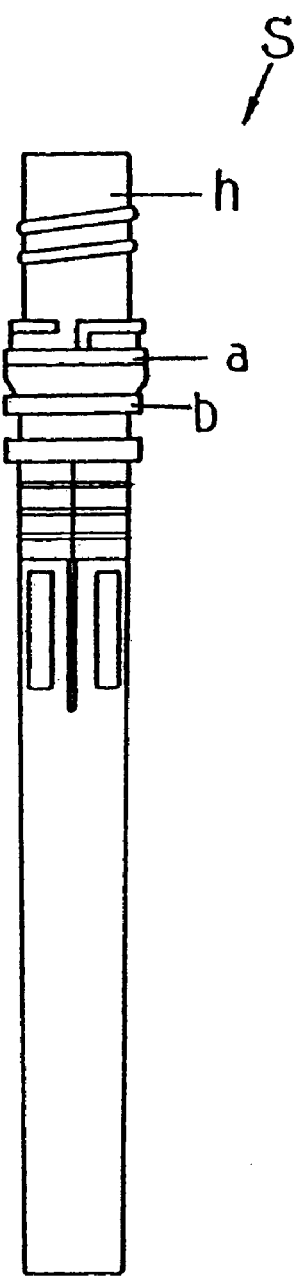
FIG. 6B is a side view thereof.

FIGS. 6A and 6B show a spout S. The spout S has flanges a, b and c and grooves d and e that are located between the flanges. The grooves d and e are respectively held in the holding grooves 24a and 26a. In the shown spout S, f indicates a sealing part, and h indicates a head portion.

A guide member 27 which transfers the spout-equipped bags from the spout holding members 26 to the spout holding members 24 is disposed between the rotor of the extraction apparatus 11 and the transfer rotor 25. The guide member 27 has a recessed groove 27a (see FIG. 5) into which the head portions h of the spouts S are inserted. The recessed groove 27a is continuously formed. The center of the recessed groove 27a at the entrance point of the guide member 27 is located on the upstream-side movement path B, the center gradually receding from the movement path B (i.e., approaching the movement path A) as the recessed groove approaches the transfer position C, the center passes through a position that is intermediate between the two paths A and B at the transfer position C, and the center is located on the movement path A at the exit point of the guide member 27.

When a spout S is held at its groove e by the holding groove 26a of the spout holding member 26 and rotated and approach the guide member 27, the head portion h of the spout S enter the recessed groove 27a (see FIG. 5A), and then the spout S is guided by this recessed groove 27a so that the spout S is gradually pulled outward from the center of the spout holding position of the spout holding member 26. Then, the transfer rotor 25 enters the period of constant-speed rotation, and the tapered portions 24b and 26bof the holding grooves 24a and 26a assume a state of partial overlapping when viewed from above.

Figure 4:
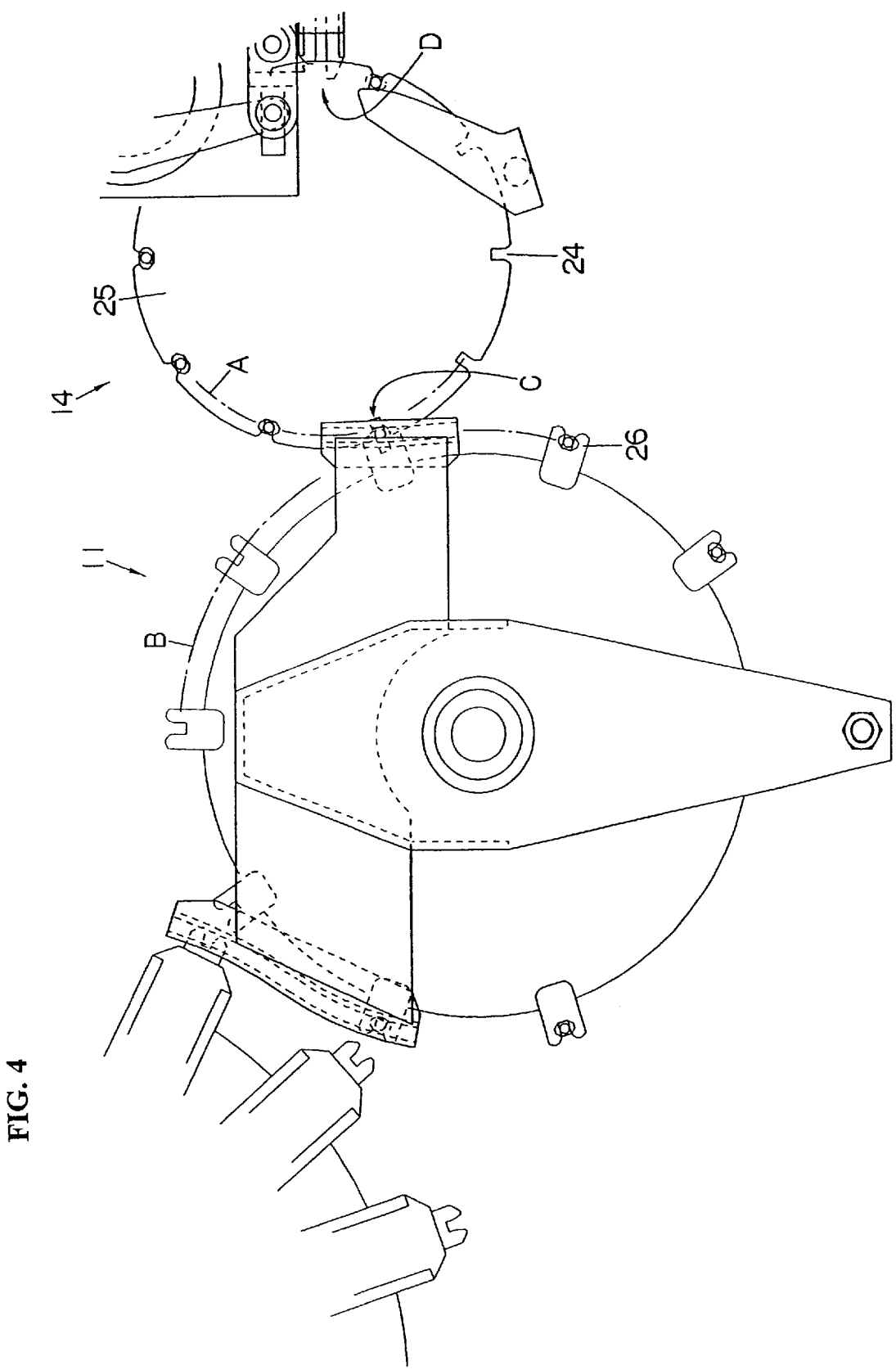
FIG. 4 is a top view of the rotary type transfer apparatus (with the transfer rotor rotating at a constant speed) and the extraction apparatus.
Figure 5A:
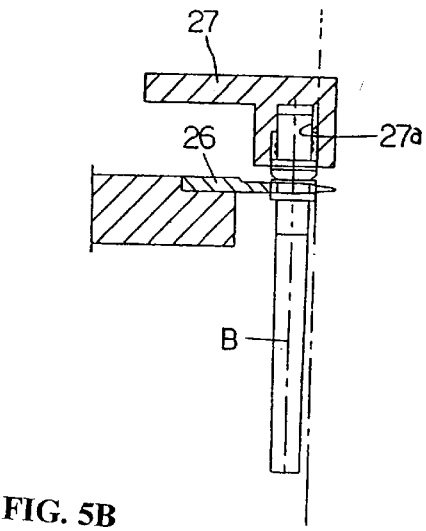
FIGS. 5A, 5B and 5S are diagrams that illustrate the conveying of a spout form the spout holding member of the extraction apparatus to the spout holding member of the rotary type transfer apparatus.
Figure 5B:
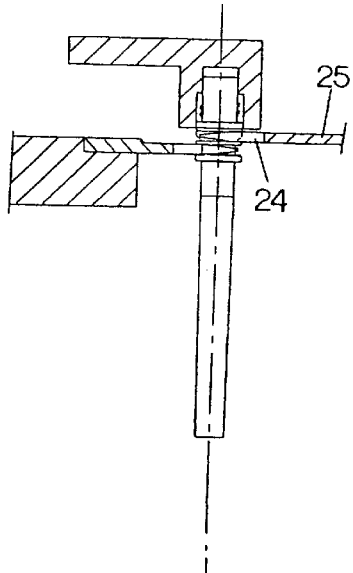
Figure 5C:
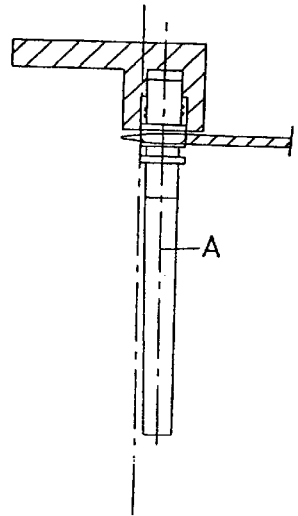

Then, when both holding grooves 24a and 26a reach the transfer position C, the spout S is pulled out as far as the tapered portion 26bof the holding groove 26a, and at the same time, the groove d of the spout S is introduced into the tapered portion 24b of the holding groove 24a (See FIGS. 4 and 5B). Furthermore, during the period of constant-speed rotation, the spout S is pulled completely out of the tapered portion 26bof the holding groove 26a and is then pushed into the holding groove 24a as far as the center of the spout holding position, so that transfer is completed (see FIG. 5C).

In the above, the heights of the spout holding members 24 and spout holding members 26 are set to be different so that the two sets of spout holding members overlap in the vicinity of the transfer position C. Thus, the spouts S can be assuredly transferred from the holding grooves 26a of the spout holding members 26 to the holding grooves 24a of the spout holding members 24.

In the above-described transfer of the spouts S, since the fan-shaped tapered portions 24b and 26bthat open outward are respectively formed in the vicinity of the entrance areas of the holding grooves 24a and 26a of the spout holding members 24 and 26, the spouts S are at their head portions h inserted into the holding grooves 24a and removed out of the holding grooves 26a without hindrance. The spout holding members 24 and 26 are in a plate-form and have a thickness that is approximately the same as the heights of the grooves d and e between the flanges of the spouts S. Accordingly, the spouts S can be accurately positioned and held in the spout holding members 24 and 26. In the tapered portions 24b and 26b, the thickness decreases toward the tip end portions as best seen from FIG. 5B, insertion into the grooves d and e is facilitated. Furthermore, the width of each one of the holding grooves 24a and 26a is set so as to be approximately the same as the distance between the grooves d—d and the distance between the grooves e—e of each spout S.

Though a detailed description is omitted, the transfer between the respective working rotors 2 and 5 through 11 in the continuous manufacturing apparatus for spout-equipped bags is performed in the same manner as described above as well as the transfer between the cold-sealing apparatus 7 and the extraction apparatus 11.

In the rotary type transfer apparatus 14, one of the stopping positions of the spout holding members 24 is taken as the transfer position D for the spout-equipped bags; spout-equipped bags are transferred to the transfer rail device 16 from the spout holding members 24 stopped in this position. Accordingly, a push-out device 28 which pushes the spouts out toward the outside in the radial direction form the holding grooves 24a of the spout holding members 24 is disposed on the rotary type transfer apparatus 14.

Figure 7:
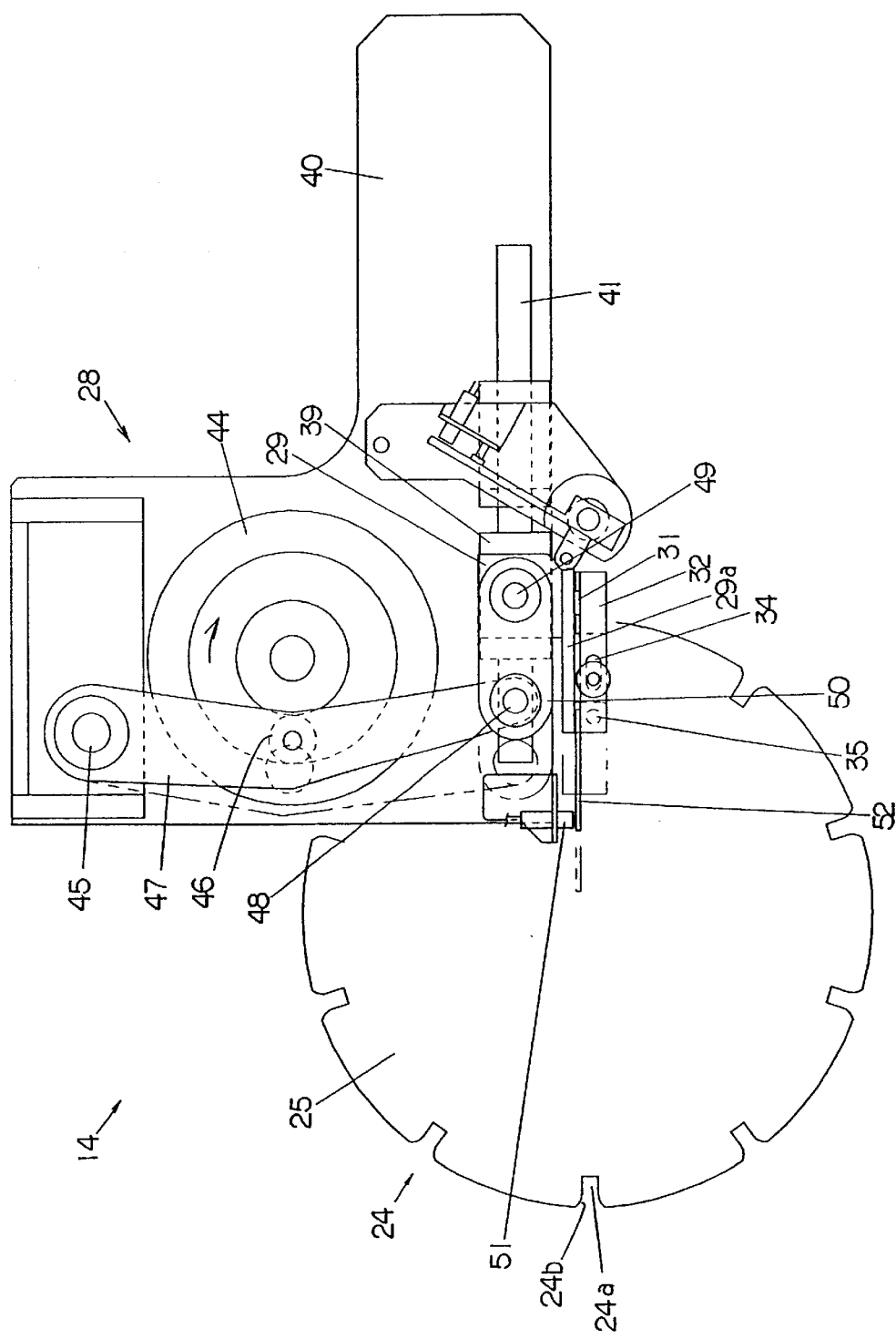
FIG. 7 is a top view of the push-out device of the rotary type transfer apparatus.
Figure 8:
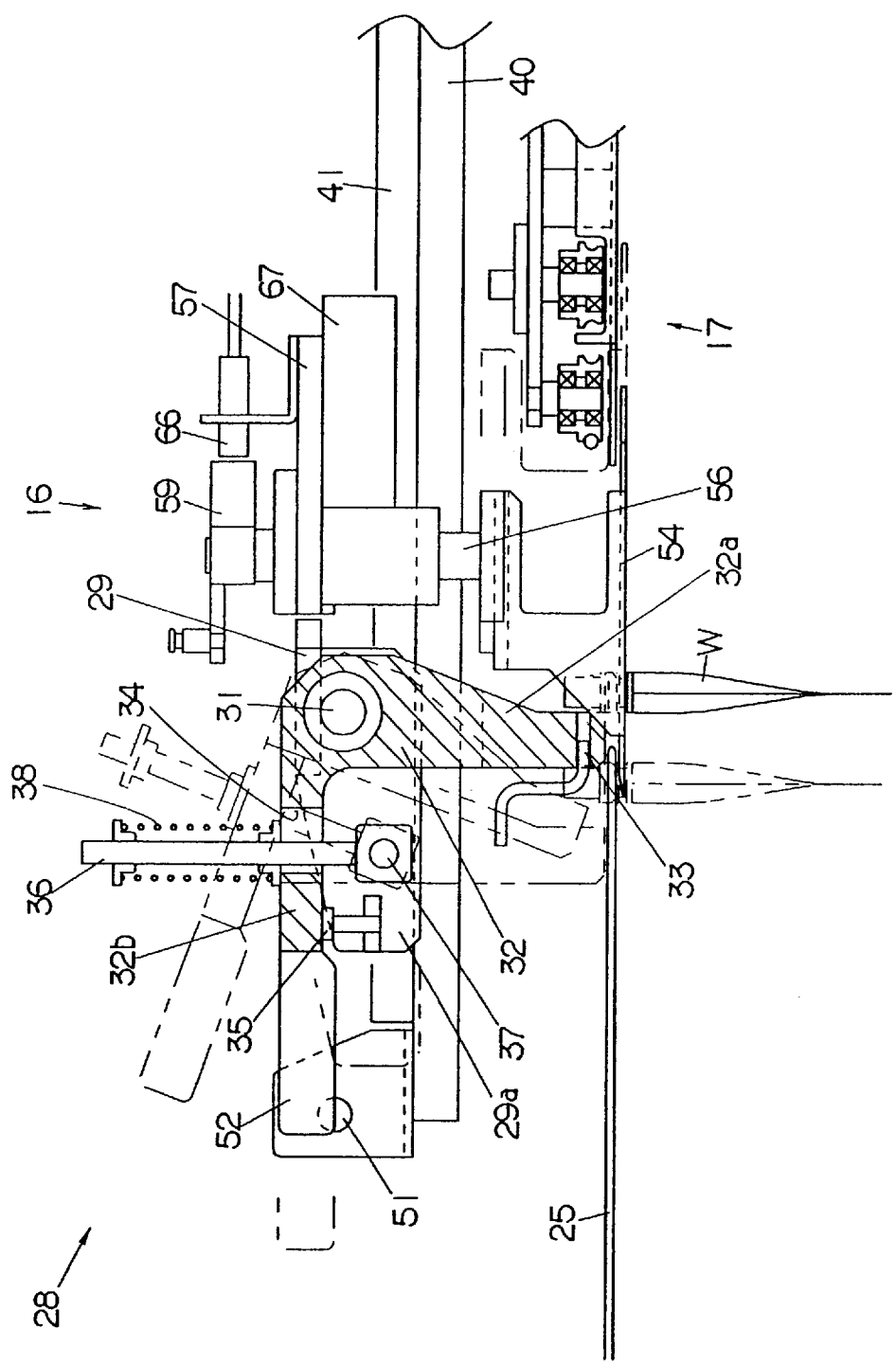
FIG. 8 is a sectional front view of the push-out device.
Figure 9:
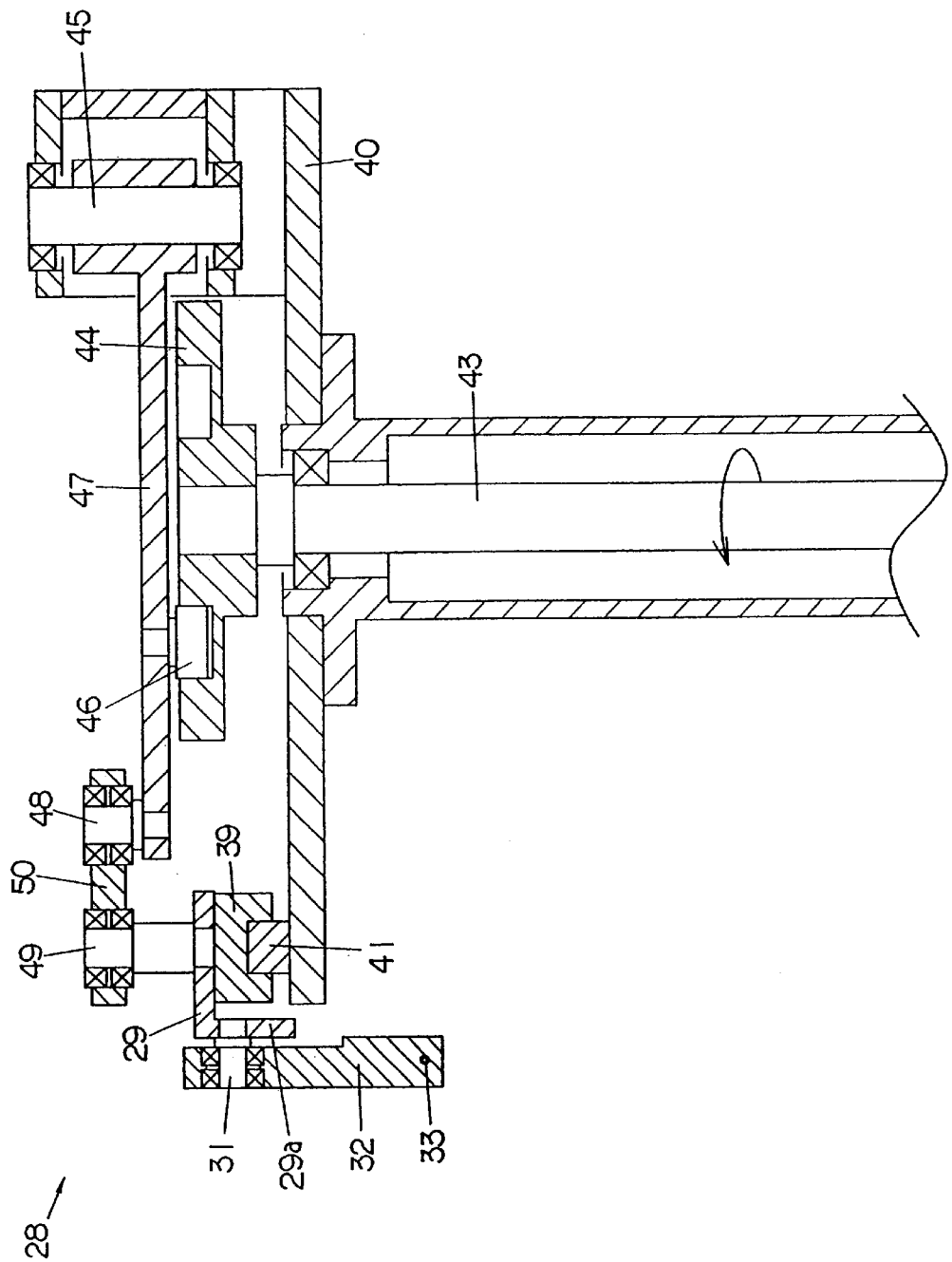
FIG. 9 is a side view (partially sectional) thereof.

As shown in FIGS. 7 through 9, the push-out device 28 is equipped with a substantially L-shaped pusher 32 which is attached to the side surface part 29a of an advancing-and-retracting plate 29 (which moves forward and rearward), so that the pusher 32 is free to swing about a supporting shaft 31. An air jet pipe 33 is disposed facing forward (outward in the radial direction of the transfer rotor 25) on the lower end of an arm 32a that extends beneath the pusher 32. This air jet pipe 33 is connected to a high-pressure source (not shown) via a switching valve and filter, etc. Furthermore, a slot 34 whose length is oriented in the forward-rearward direction is formed in an arm 32b which extends horizontally to the rear of the pusher 32.

A stopper 35 which regulates the position of the arm 32a is disposed on the side surface part 29a of the advancing-and-retracting plate 29, and a spring guide shaft 36 is disposed so that this shaft 36 is free to swing about a supporting shaft 37. The spring guide shaft 36 passes through the slot 34 and extends upward. A compression spring 38 is attached to the spring guide shaft 36, and the arm 32b is pushed toward the stopper 35 by the driving force of this compression spring 38. As a result, the arm 32a of the pusher 32 is driven forward by a constant driving force and is regulated by the stopper 35 so that the arm 32a is ordinarily maintained in a position in which the arm faces directly downward. However, in cases where a resistance that exceeds the driving force of the compression spring 38 is applied when the pusher 32 is moved accompanying the advance of the advancing-and-retracting plate 29, this movement stops; and the arm 32a of the pusher 32 swings rearward about the supporting shaft 31 and is inclined as indicated by dashed imaginary line in FIG. 8.

Thus, the safety mechanism referred to in the present invention is obtained by combining a structure in which the pusher 32 is swingable rearward with the stopper 35 and compression spring 38, etc. As a result, damage to the spout-equipped bags (and especially to the spouts S) can be prevented.

A slide block 39 is attached to the lower part of the advancing-and-retracting plate 29, and this slide block 39 is arranged so that it is free to slide on a slide rail 41 which is fastened to the surface of a base plate 40 (the base plate of the push-out device 28 and transfer rail device 16).

The driving mechanism which causes the advancing-and-retracting plate 29 to move forward and rearward comprises a drive shaft 43, a groove cam 44, a swinging arm 47, and a connecting link 50. The drive shaft 43 is rotatably supported on a supporting stand 42 and is rotated by a driving source (not shown). The groove cam 44 is attached to the upper end of the drive shaft 43. The swinging arm 47 is swingable about a supporting shaft 45 and has a cam roller 46 that rolls inside the groove cam 44 in the neutral position. The connecting link 50 is provided so that one end thereof is pivotably attached to a connecting shaft 48 which is fastened to the tip end of the swinging arm 47, and another end of the connecting link 50 is pivotably attached to a connecting shaft 49 which is fastened to the advancing-and-retracting plate 29. When the drive shaft 43 rotates, the swinging arm 47 swings, and the connecting link 50 is moved forward and rearward. As a result, the pusher 32 advances and retracts (solid line shows the advanced position, and imaginary line shows the retracted position).

A proximity sensor 51 is attached to the base plate 40, and a sensed member 52 that is sensed by the proximity sensor 51 is attached to a position on the rear part of the arm 32b of the pusher 32. When the safety mechanism acts as described above so that the pusher 32 swings rearward, the sensed member 52 swings upward along with the arm 32b, so that the proximity sensor 51 no longer senses the sensed member 52. As a result, it is known that the safety mechanism has operated.

Furthermore, as shown in FIG. 3, a forcible discharge guide 53 is disposed on the rotary type transfer apparatus 14. This forcible discharge guide 53 is disposed above the transfer rotor 25 on the forward side of the transfer position D with respect to the direction of rotation, and has a contact surface 53a which faces outward from the inside of the movement path A. This contact surface 53a contacts the head portions h of the spouts S and acts to push the spouts S out of the holding grooves 24a.

Next, before the transfer of the spout-equipped bags from the rotary type transfer apparatus 14 to the rail conveying apparatus 15 is described, the transfer rail device 16 and second rail device 17 which form parts of the rail conveying apparatus 15 will be explained.

Figure 10:
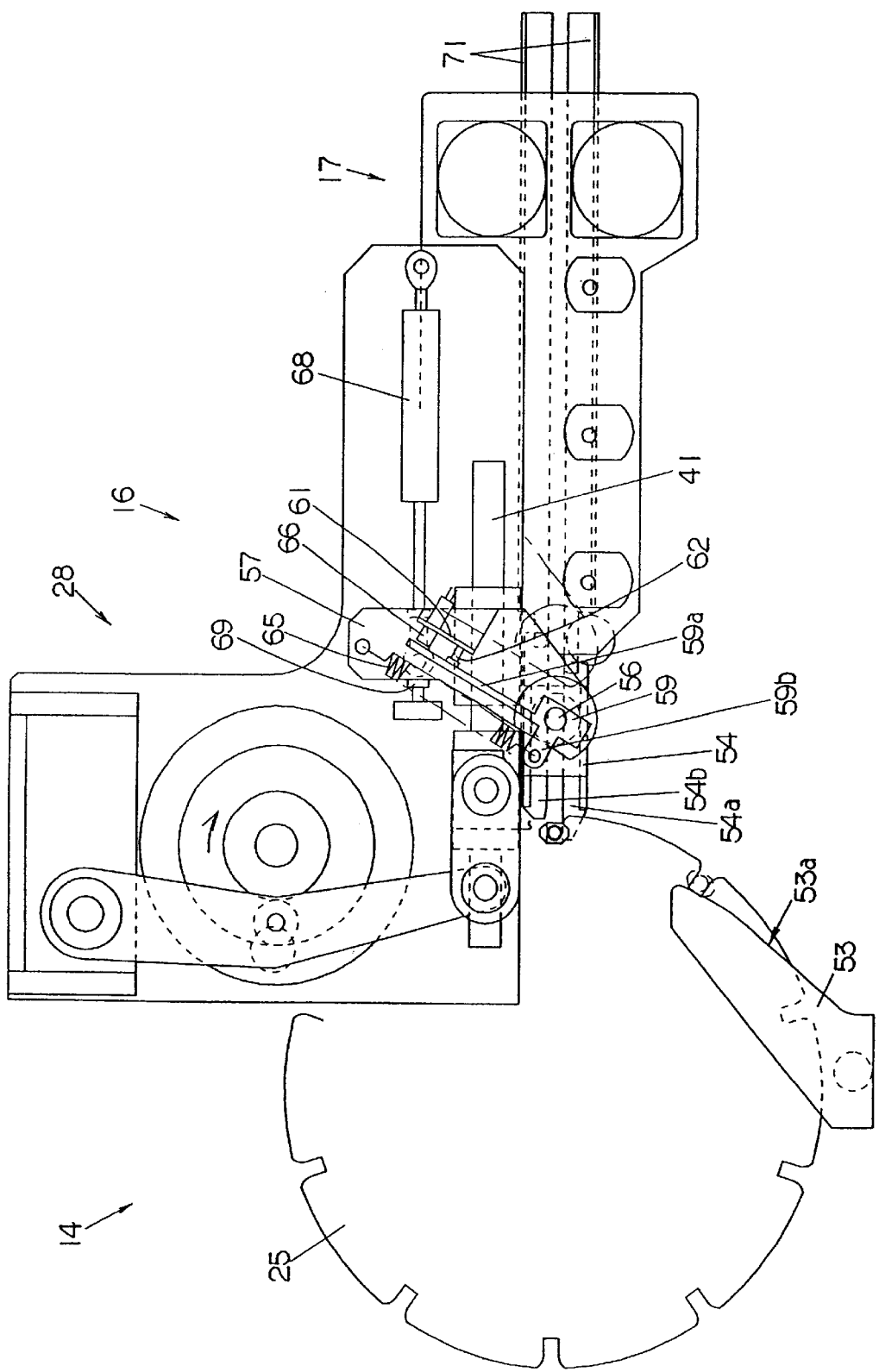
FIG. 10 is a top view of the transfer rail device.
Figure 11:
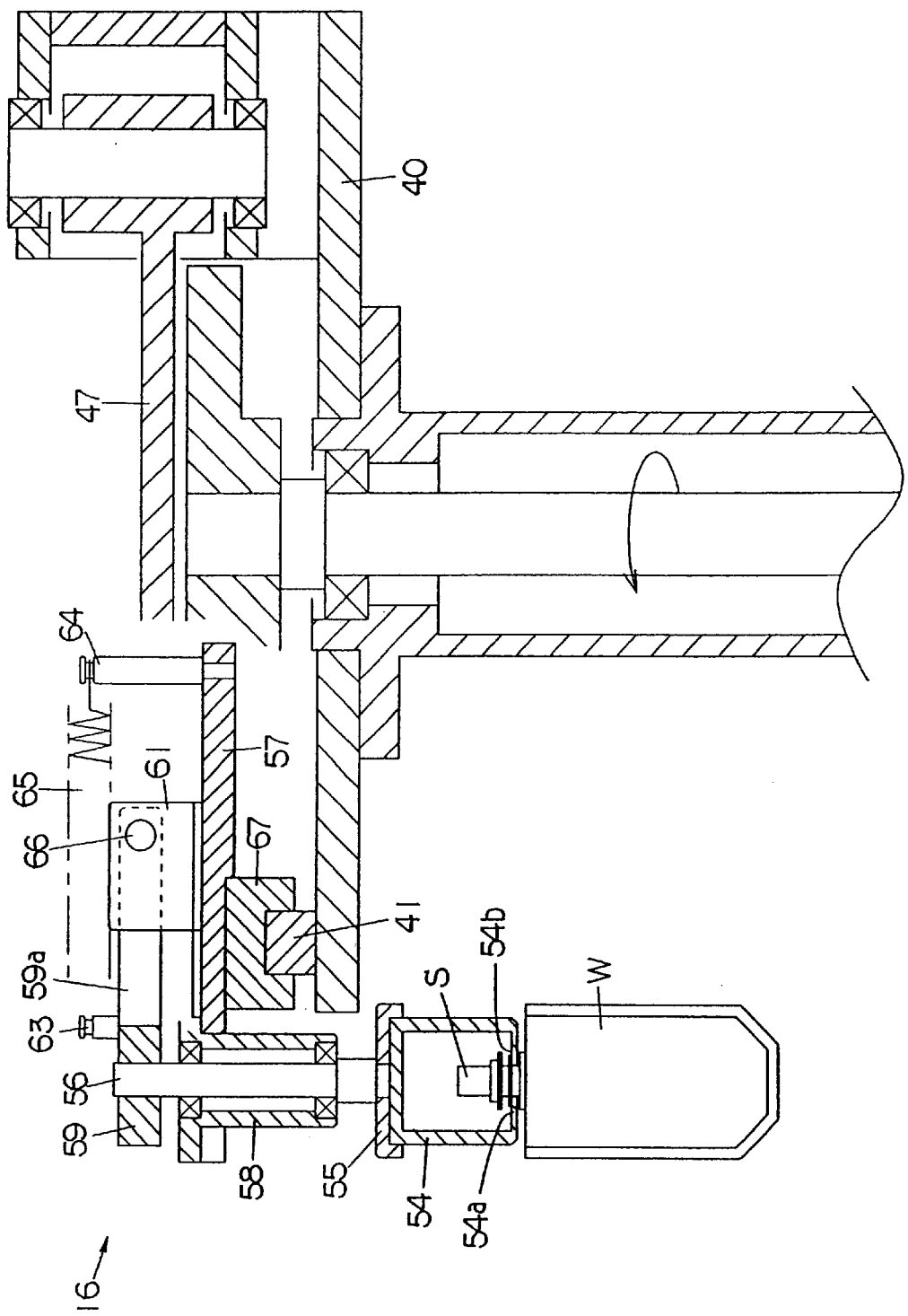
FIG. 11 is a sectional front view thereof.

As shown in FIGS. 8, 10 and 11, the transfer rail device 16 is comprised of transfer rail 54, a supporting shaft 56, a bearing member 58, and a substantially L-shaped swinging member 59. The transfer rail 54 has a pair of spout guides 54a and 54b on the left and right (these parts enter the grooves e of the spouts S, and thus hold the spouts S). The supporting shaft 56 supports the transfer rail 54 via a rail attachment part 55. The bearing member 58 is fastened to an advancing-and-retracting plate 57 and supports the supporting shaft 56 so that the shaft is free to rotate. The winging member 59 is fastened to the upper end of the supporting shaft 56.

Furthermore, a stopper 62 which regulates the position of the long arm 59a of the swinging member 59 is disposed on an attachment pale 61 on the advancing-and-retracting plate 57, and a tension spring 65 is mounted between a hook 63 which is disposed in an upright position on the end part of the short arm 59b of the swinging member 59 and a hook 64 which is disposed in an upright position on the advancingand-retracting plate 57, so that the swinging member 59 is driven in a right-hand rotational direction (i.e., in the opposite direction from the direction of rotation of the transfer rotor 25 at the transfer position D) and is pushed toward the stopper 62.

As a result, the transfer rail 54 is driven in a right-hand rotational direction by a constant driving force and is ordinarily regulated by the stopper 62 in a position in which the transfer rail 54 is oriented in the forward-rearward direction (i.e., in the radial direction of the transfer rotor 25 at the transfer position D). However, in cases where a force that exceeds the driving force of the tension spring 65 is applied in a left-hand rotational direction, the transfer rail 54 can rotate in the left-hand rotational direction. As a result, damage to the spout-equipped bags (and especially to the spouts S) can be prevented. In the above, the spout-equipped bags are referred to by W.

A proximity sensor 66 is attached to the attachment plate 61, and the tip end of the long arm 59a of the swinging member 59 also acts as a sensed member which is sensed by the proximity sensor 66. When a force exceeding the driving force of the tension spring 65 is applied to the transfer rail 54 in a left-hand rotational direction, the long arm 59a of the swinging member 59 rotates in this left-hand rotational direction together with the transfer rail 54, so that the proximity sensor 66 no longer senses the arm 59a. Conversely, by way of this, it is known that a force exceeding the driving force of the tension spring 65 has been applied to the transfer rail 54 in the left-hand rotational direction.

A slide block 67 is attached to the lower part of the advancing-and-retracting plate 57, and this slide block 67 is arranged so that it is free to slide on the slide rail 41. The advancing-and-retracting plate 57 is caused to move forward and rearward by an air cylinder 68; as a result, the transfer rail 54 moves forward and rearward. The rear-end position of the advancing-and-retracting plate 57, i.e., the rear-end position of the transfer rail 54 is regulated by a stopper 69 which is disposed on the base plate 40. The transfer rail 54 is ordinarily positioned in the rear-end position (i.e., the position indicated by solid line in FIGS. 8 and 10) and can be moved to a forward position (i.e., the position indicated by an imaginary line in FIGS. 8 and 10) as necessary by the driving of the air cylinder 68. This forward position is a retracted position in which the transfer rail 54 does not receive spouts S.

The transfer rail 54 is disposed so that it is ordinarily oriented in the radial direction of the transfer rotor 25 on the outside (with respect to the radial direction) of the transfer position D of the transfer rotor 25 and so that the spout guides 54a and 54b of the transfer rail 54 are positioned on extensions of the holding grooves 24a of the spout holding members 24 stopped in the transfer position D. Furthermore, the spout guides 54a and 54b are set at a different height than the spout holding members 24. When the transfer rail 54 is in the ordinary rear-end position, the spot guide part 54a that is positioned on the forward side of the transfer rotor 25 with respect to the direction of rotation of the rotor extends to a position that overlaps with the movement path A. The spout guide 54b that is positioned on the rearward side extends to a position that overlaps (as seen in a top view) with the tip end (tapered portion 24b) of the holding groove 24a of the spout holding member 24 that is stopped in the transfer position D.

Figure 12:
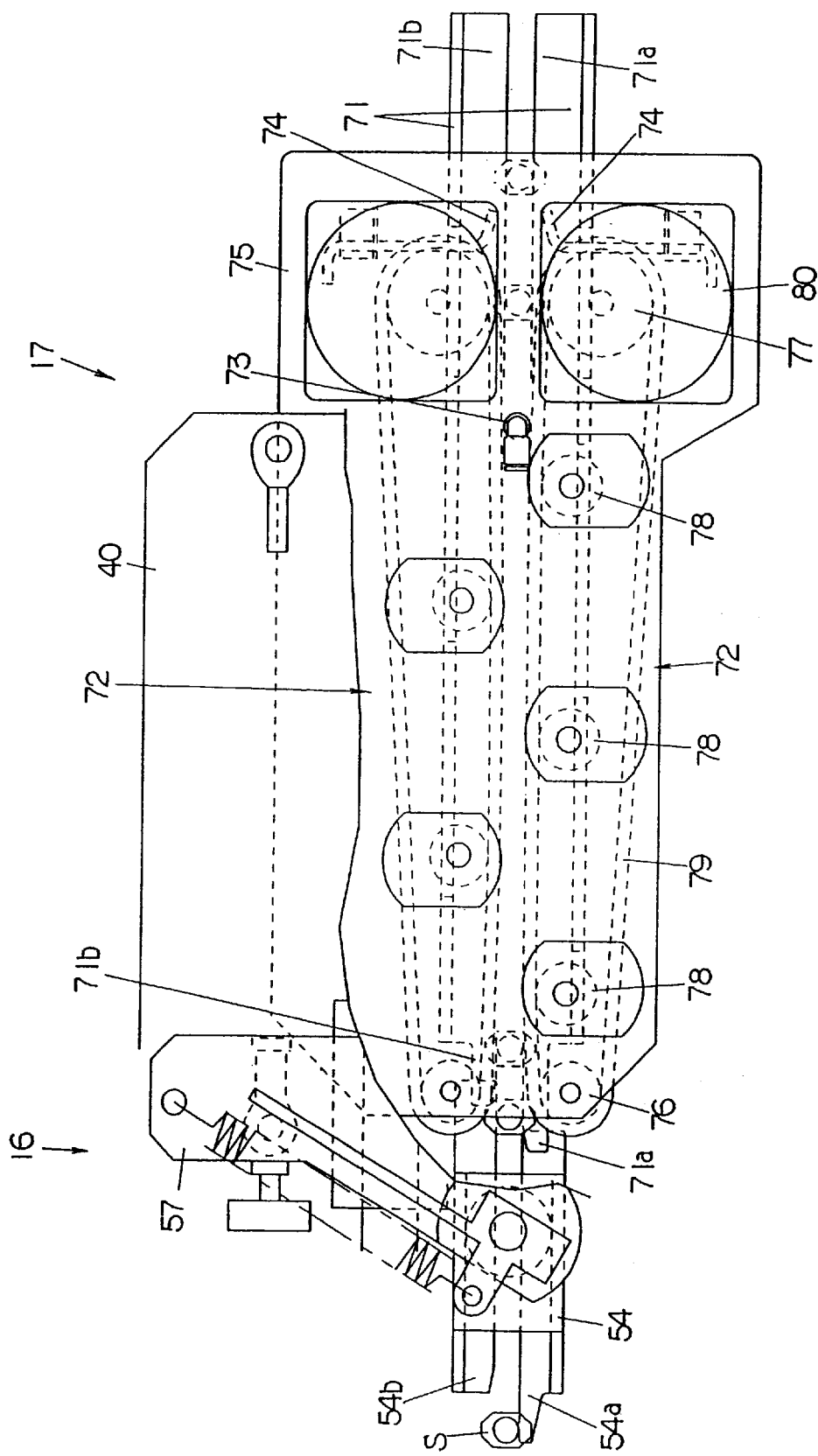
FIG. 12 is a top view of the second rail device.
Figure 13:
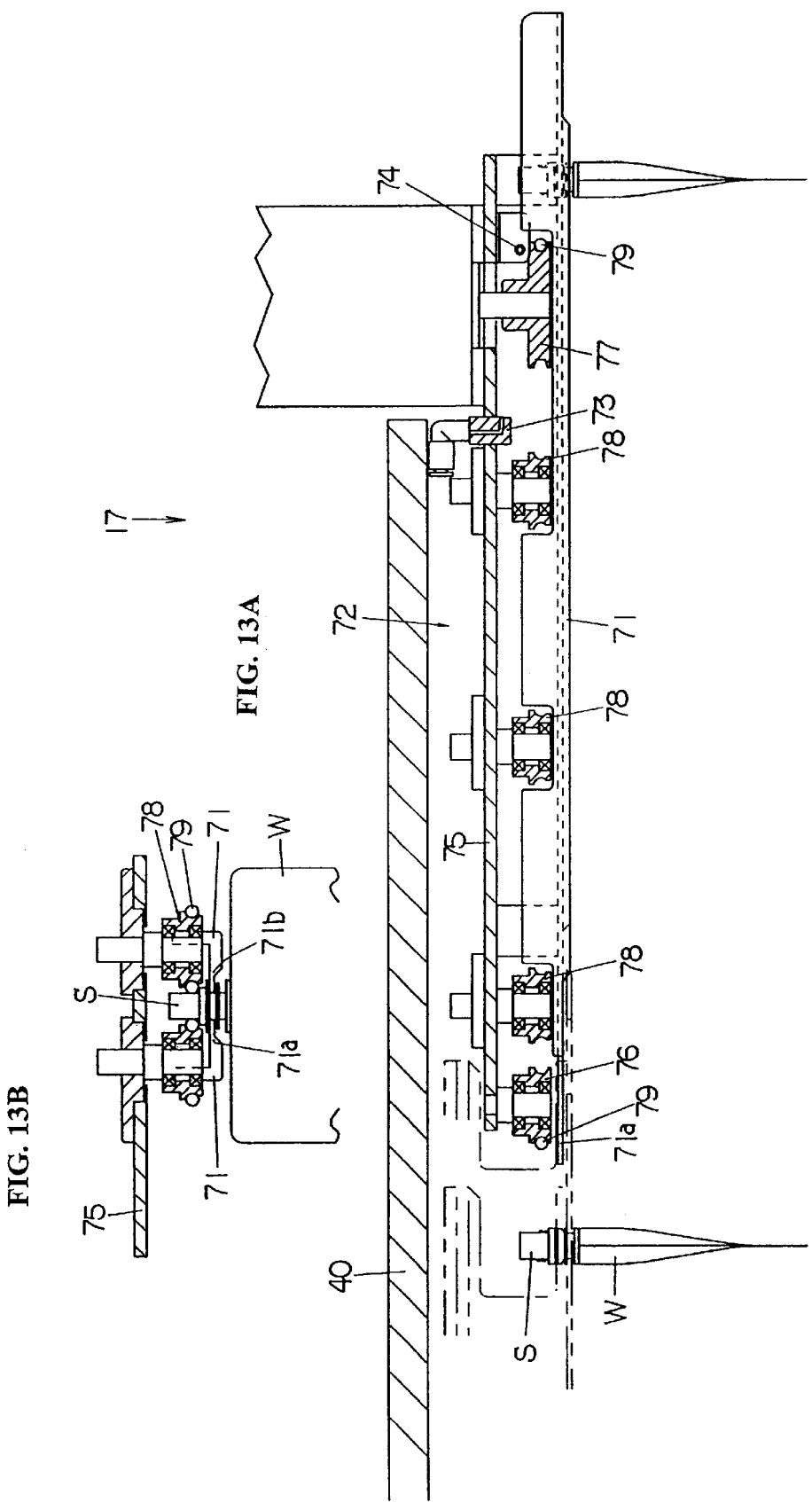
FIGS. 13A and 13B are side views thereof.

As seen from FIGS. 12 and 13, the second rail device 17 is comprised of a pair of fixed conveying rails 71, a pair of belt conveying devices 72, and an air jet nozzle 73 and air jet pipes 74. The pair of fixed conveying rails 71 have respective spout guides (parts that enter the grooves d of the spouts S and thus hold the spouts S) 71 and 71b. The pair of belt conveying devices 72 are disposed at a predetermined spacing above the fixed conveying rails 71. The airjet nozzle 73 and airjet pipes 74 are likewise disposed above the conveying rails 71 and are connected to a high-pressure source (not shown) via a switching valve and filter, etc.

These components of the second rail device 17 are provided on the base plate 75.

The respective belt conveying devices 72 are disposed along the fixed conveying rails 71. Each belt conveying device 72 is comprised of a driven pulley 76 which is disposed on the entry side (rearward side), a driving pulley 77 which is disposed on the exit side (forward side), a plurality of intermediate pulleys 78, a round belt 79 which is mounted on these pulleys, and a motor 80. The belt conveying devices 72 are arranged so that the round belts 79 contact the head portions h of the spouts S from both sides, thus causing the spouts S to be conveyed forward by the frictional force of the round belts 79 as the round belts 79 rotate.

However, the spacing between the round belts 79 widens over a predetermined range in the vicinity of the entrance areas and the vicinity of the exit points of the belt conveying devices 72, so that the round belts 79 does not contact the head portions h in these ranges. The air jet nozzle 73 is disposed facing the head portions h of the spouts S in a position located just before the point at which the spacing of the round belts 79 begins to widen, and a pair of air jet pipes 74 are disposed facing the head portions h of the spouts S at the exit points of the belt conveying devices 72.

The fixed conveying rails 71 are positioned on the forward side of the transfer rail 54, and the spout guides 71a and 71b of the fixed conveying rails 71 are disposed so that they are located on extensions of the spout guides 54a and 54b of the transfer rail 54. The spout guides 71a and 71b are set at a different height than the spout guides 54a and 54b. In addition, the spout guides 71a and 71b extend to the rear so that they overlap with the spout guides 54a and 54b when viewed from above even when the transfer rail 54 is in the ordinary rear-end position. Moreover, even when the transfer rail 54 is caused to move forward by the action of the air cylinder 68, the transfer rail 54 and fixed conveying rails 71 do not interfere with each other.

Here, the transfer of bags W with attached spouts from the rotary type transfer apparatus 14 to the transfer rail device 16, and the transfer operation from the transfer rail device 16 to the second rail device 17, will be described.

In the rotary type transfer apparatus 14, when the spouts S held in the holding grooves 24a of the spout holding members 24 stop in the transfer position D, the pusher 32 (which has been retracted up to this point in time) advances so that the lower end of the arm 32a contacts the head portion h of the corresponding spout S held in the holding groove 24a; this lower end of the arm 32a pushes the spout out in the forward direction, and at the same time, high-pressure air jets toward the head portion h of the spout S from the air jet pipe 33, so that the spout S is fed out toward the transfer rail device 16 and the second rail device 17 located beyond the transfer rail device 16. In the rotary type transfer apparatus 14, the groove d of the spout S is held in the holding groove 24a; however, in the transfer rail device 16, the groove e is held in the spout guides 54a and 54b.

In the rotary type transfer apparatus 14, the spout holding members 24 receive the spouts S from the spout holding members 26 which are continuously rotating at the same speed while the transfer rotor 25 is rotating at a constant speed. Accordingly, high-speed processing is possible. Furthermore, since the spouts S held by the spout holding member 24 are transferred to the transfer rail 54 which is similarly stopped while the spout holding members 24 are stopped in the transfer position D, it is unlikely that errors occur when receiving the spouts S.

Furthermore, the spout guides 54a and 54b of the transfer rail 54 and the spout holding members 24 are at different heights, and one spout guide 54a extends to a position that overlaps with the movement path A, and the other spout guide 54b extends to a position that overlaps with the tip ends of the holding grooves 24a of the spout holding members 24 (as seen in a top view). Accordingly, the spouts S can be stably transferred to the transfer rail 54 from the holding grooves 24a of the spout holding members 24.

The spout-equipped bags that are fed out from the rotary type transfer apparatus 14 pass through the transfer rail device 16 and enter the second rail device 17. The spout-equipped bags that have entered the second rail device 17 are held in the spout guides 71a and 71b of the fixed conveying rails 71 and are fed forward by the round belts 79 of the belt conveying devices 72 along the spout guides 71a and 71b. After the conveying by the round belts 79 is completed, the spout-equipped bags are forcefully fed further forward along the fixed conveying rails 71 by the air jet nozzle 73 and air jet pipes 74, and these bags are then fed into the third rail device 18. While the spout-equipped bags are being conveyed on the fixed conveying rails 71 by the round belts 79, these bags are conveyed in a densely concentrated state on the fixed conveying rails 71. However, since the bags are conveyed by high-pressure air at and near the exit points of the fixed conveying rails 71, the speed is increased, and the spacing of the respective spout-equipped bags is spread out.

The spout guides 54a and 54b of the transfer rail 54 and the spout guides 71a and 71b of the fixed conveying rails 71 are set at different heights; and the spout guides 54a and 54b hold the grooves e of the spouts S, while the spout guides 71a and 71b hold the grooves d of the spouts S. Furthermore, the rear ends of the spout guides 71a and 71b extend to positions that overlap with the spout guides 54a and 54b when viewed from above. Accordingly, the spouts S can be stably transferred from the transfer rail 54 to the fixed conveying rails 71.

In case where a device on the downstream side of the transfer rail device 16, e.g., the second rail device 17, develops trouble and is stopped, the spouts S immediately stop on the fixed conveying rails 71 and transfer rail 54, and following spouts S that are fed out of the rotary type transfer apparatus 14 are obstructed by these spouts and therefore cease to be pushed out from the holding grooves 24a. When this occurs, the safety mechanism is actuated so that the pusher 32 ceases to move forward, and this is sensed by the proximity sensor 51. Thus, for example, the supply of bags and spouts to the spout insertion and temporary-sealing apparatus 2 is stopped, and at the same time, the air cylinder 68 is actuated so that the transfer rail 54 is moved forward, allowing an inspection or repair operation to be initiated. The spouts S that remain without being pushed out from the holding grooves 24a are pushed out by the forcible discharge guide 53.

When only the supply of bags and spouts to the spout insertion and temporary-sealing apparatus 2 (among the various parts of the continuous manufacturing apparatus for spout-equipped bags) is stopped, the spouts, bags and spout-equipped bags that are conveyed through the respective devices from the spout insertion and temporary-sealing apparatus 2 and transfer apparatus 8 onward enter the rotary type transfer apparatus 14 from the transfer position C as product spout-equipped bags in the ordinary manner. Then, they are pushed out from the holding grooves 24a at the transfer position D. Meanwhile, the transfer rail 54 has moved to its forward retracted position, the spout-equipped bags that are fed out are not received by the transfer rail 54 but instead drop and are collected in a predetermined position by means of a chute 81 (see FIG. 2).

Accordingly, there is no manufacture of large numbers of defective products, and the problem of fusion of plastic to the sealing apparatus does not arise. Furthermore, there is no excessive pushing of spouts S onto the fixed conveying rails 71, etc., on the downstream side of the transfer rail device 16. Accordingly, a further trouble is also prevented.

In the above, the receiving of spouts from the spout holding members 24 of the rotary type transfer apparatus 14 is avoided by causing the transfer rail 54 as a whole to retract in the forward direction. However, as long as the receiving of spouts can be avoided, some other appropriate retraction configuration may be adopted.

Furthermore, when a left-hand rotational force that exceeds the driving force of the tension spring 65 is applied to the transfer rail 54 for some reason such as a spout S striking the spout guide 54a of the transfer rail 54 as a result of faulty timing of the stopping of the transfer rotor 25, etc., this is sensed by the proximity sensor 66. In this case as well, the supply of bags and spouts to the spout insertion and temporary-sealing apparatus 2 is stopped in the same manner as described above, and the air cylinder 68 is actuated so that the transfer rail 54 is moved forward, after which inspection or repair operations are initiated.

Next, the third rail device 18 and the accommodating apparatus 13 for spout-equipped bags will be described.

Figure 14:
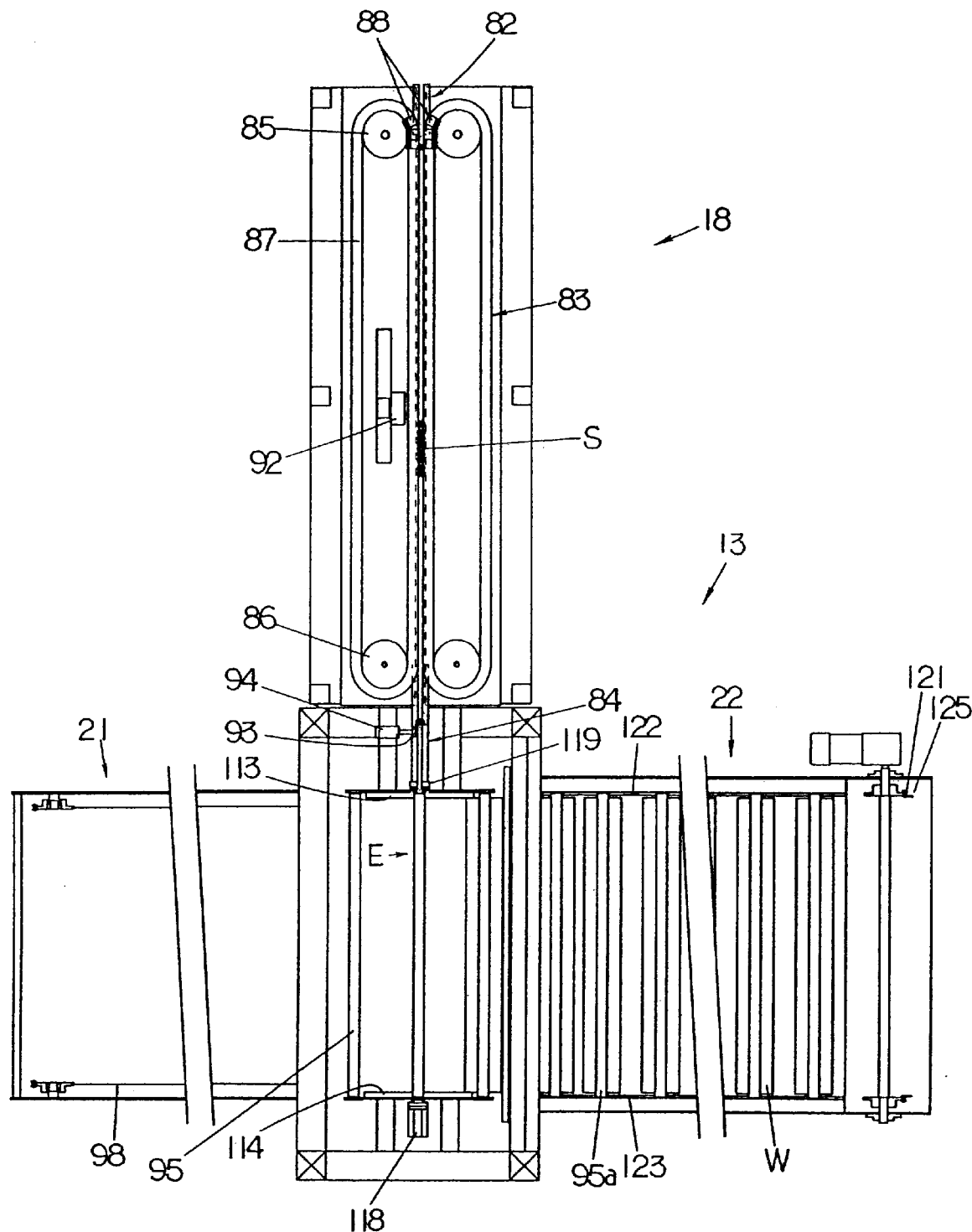
FIG. 14 is a top view of the third rail device and the accommodating apparatus for spout-equipped bags.
Figure 15:
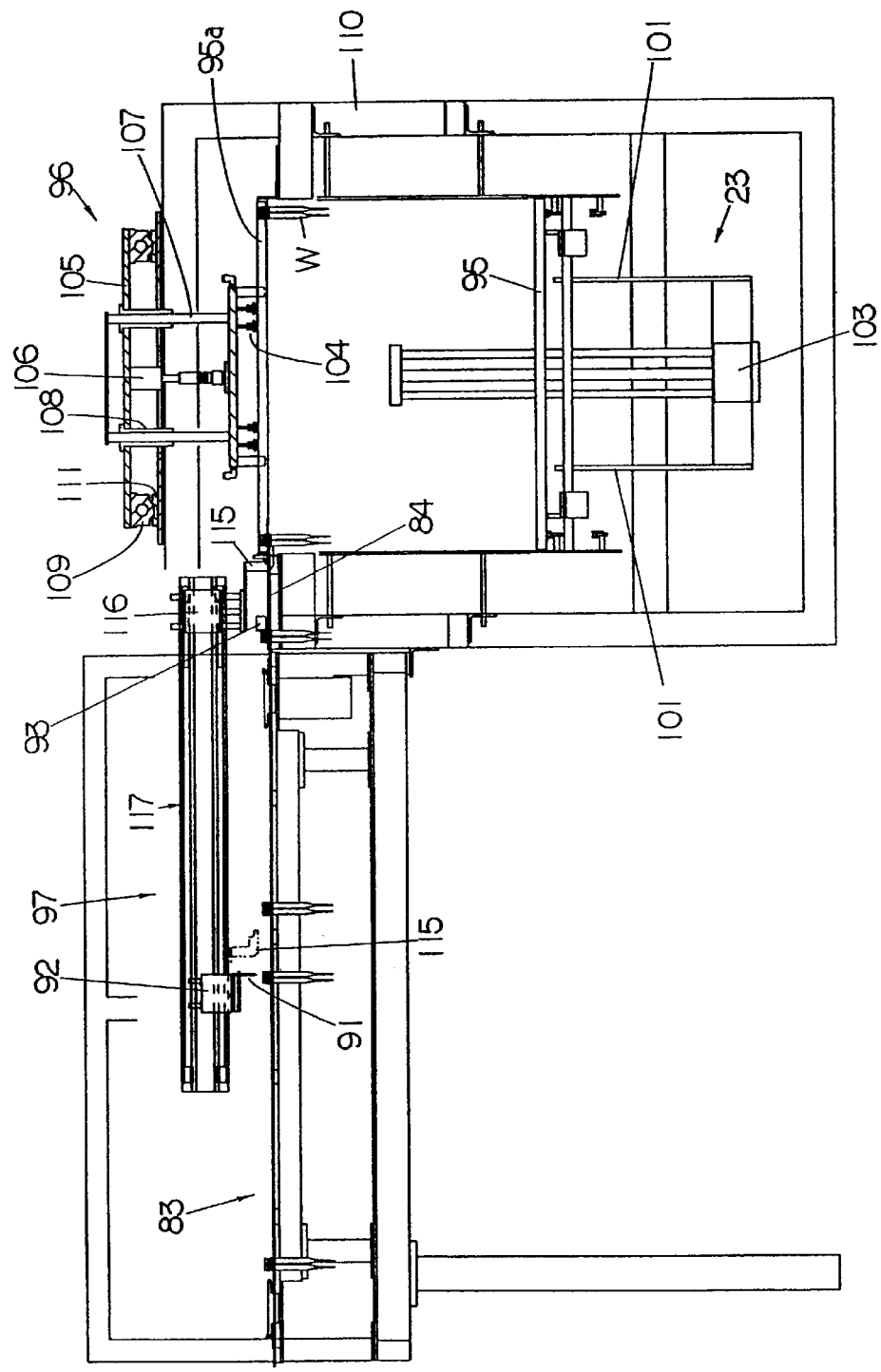
FIG. 15 is a sectional side view thereof.
Figure 16:
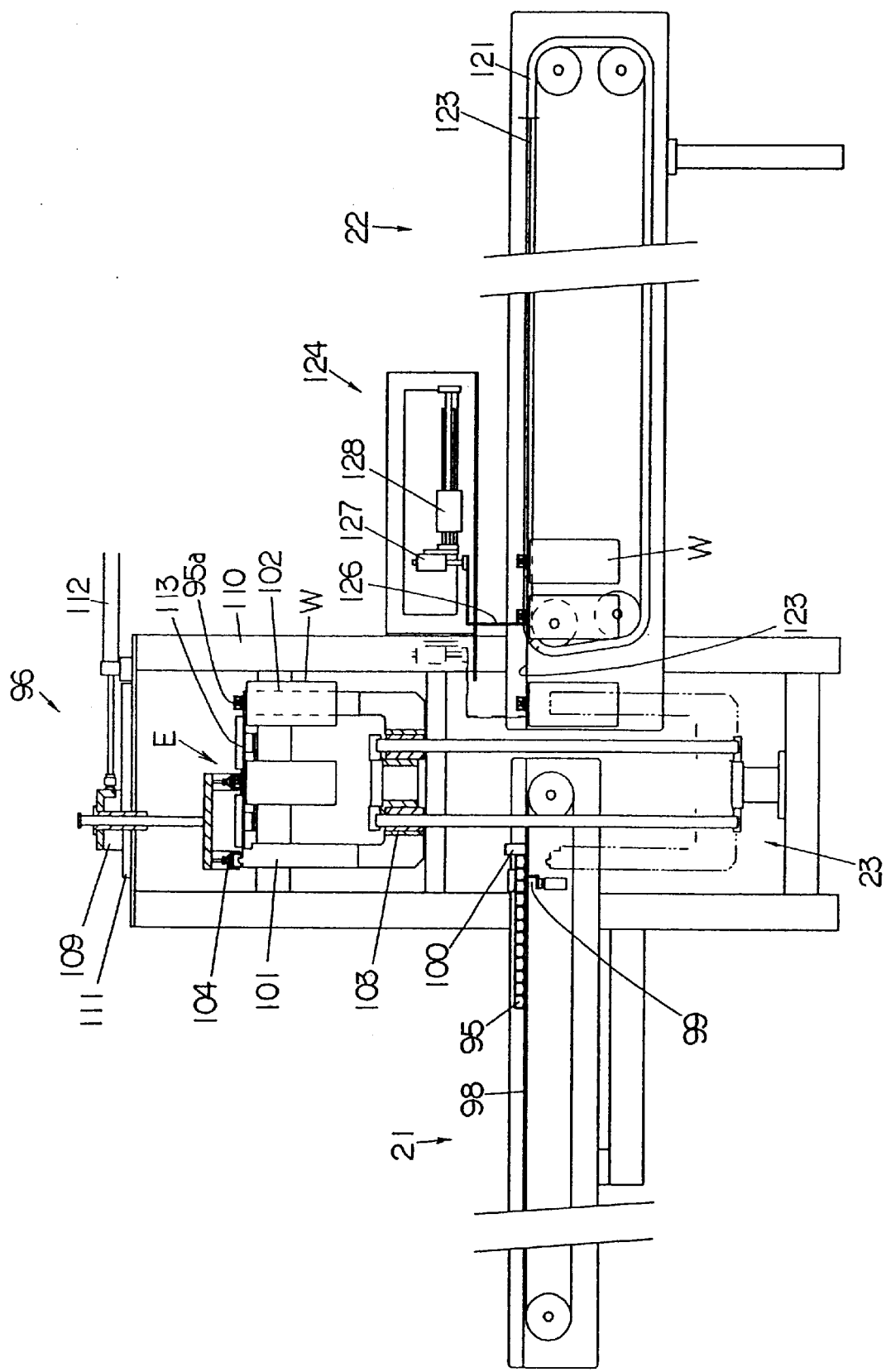
FIG. 16 is a sectional front view thereof.

As shown in FIGS. 14 through 16, the third rail device 18 is comprised of rear-side fixed conveying rails 82, a pair of block-form rail conveying bodies 83 which rotate in the horizontal plane, and a front-side fixed conveying device 84. Each of the block-form rail conveying bodies 83 is comprised of a chain 87, which is mounted in "endless" form on sprockets 85 and 86, and block-form rails 88, which are attached facing horizontally outward around this chain 87. The respective block-form rails 88 have a cross-sectional shape that is more or less similar to that of the fixed conveying rails 71 shown in FIG. 13B. In the linear portions, these block-form rails 88 are in a close contact in the forward-rearward direction and face each other at a predetermined spacing. Thus, these block-form rails take an overall configuration resembling that of a pair of rails and move forward at a constant speed.

The spout guides (not shown) of the fixed conveying rails 82 are positioned on extensions of the spout guides 71a and 71b of the fixed conveying rails 71 of the second rail device 17, and they are set at a different height than the spout guides 71a and 71b. Furthermore, these spout guides overlap when viewed from above.

The spout guides (not shown) of the block-form rails 88 are positioned on extensions of the spout guides of the fixed conveying rails 82 in the linear portions, and they are set at a different height than the spout guides, with these spout guides likewise overlapping when viewed from above.

Furthermore, the spout guides (not shown) of the fixed conveying rails 84 are positioned on extensions of the spout guides of the block-form rails 88 in the linear portions, and they are set at a different height than the spout guides, with these spout guides likewise overlapping when viewed from above.

Furthermore, a first stopper 91 that stops the spouts S on the block-form rail conveying bodies 83 and an air cylinder 92 which raises and lowers the first stopper 91 are disposed at predetermined positions above the block-form rail conveying bodies 83. A second stopper 93 which stops the spouts S and an air cylinder 94 which causes the second stopper 93 to advance and retract are disposed in predetermined positions above the fixed conveying rails 84. The air cylinder 92 is operated by the detection signal of a detection device (not shown) which counts the number of spouts.

The accommodating apparatus 13 for spout-equipped bags accommodates a predetermined number of spout-equipped bags on accommodating rails 95. As seen from FIGS. 14 through 16, the bag accommodating apparatus 13 is comprised of an empty-accommodating-rail feed-in device 21, a full-accommodating-rail feed-out device 22, an accommodating-rail raising-and-lowering device 23, an accommodating-rail transfer device 96, and an insertion device 97. The accommodating rails 95 are those known in prior art. For example, the accommodating rails 95 have a pair of spout guides, and the grooves d of the spouts S are inserted and held in these spout guides, as described in Japanese Patent No. 2500557.

The empty-accommodating-rail feed-in device 21 is comprised of a pair of chain conveyors 98, both ends of which being mounted on sprockets, a separating stopper 99, and a positioning stopper 100. The chain conveyors 98 carry empty accommodating rails (accommodating rails not accommodating any spout-equipped bags) 95 and convey these empty accommodating rails 95 toward the accommodating-rail raising-and-lowering device 23. The separating stopper 99 rises and stops the accommodating rails 95 beginning with the second accommodating rail 95 from the leading accommodating rail 95 at the head of the line of accommodating rails, and the positioning stopper 100 positions the leading accommodating rail 95 at the head of the line of accommodating rails. In this case, slipping occurs between the stopped accommodating rails 95 and the chain conveyors 98.

The accommodating-rail raising-and-lowering device 23 is disposed on the front end part of the empty-accommodating-rail feed-in device 21; and it is comprised of two sets of engaging members 101 and 102, which respectively carry two accommodating rails 95 at a predetermined spacing, and a rodless cylinder 103, which raises and lowers these two sets of engaging members 101 and 102. The engaging members 101 carry and raise the leading empty accommodating rail 95 on the chain conveyors 98, and the engaging members 102 carry and lower the full accommodating rails (accommodating rails accommodating bags W with attached spouts) 95a and place these full accommodating rails on carrying tables 122 and 123, which will be described below.

The accommodating-rail transfer device 96 is comprised of transfer suction disks 104 disposed in two rows an air cylinder 106 which is attached to an advancing-and-retracting plate 105 and raises and lowers the transfer suction disks 104. The accommodating-rail transfer device 96 is further comprised of raising-and-lowering guide shafts 107 which guide the raising and lowering of the transfer suction disks 104, bearings 108 which are attached to the advancing-and-retracting plate 105 and through which the raising-and-lowering guide shafts 107 slide, slide blocks 109 which are attached to the lower part of the advancing-and-retracting plate 105, slide rails 111 which are disposed on a frame 110, and an air cylinder 112 used for left-right movement.

By way of raising and lowering the transfer suction disks 104 disposed in two rows, and moving these transfer suction disks 104 to the left and right, the above-described accommodating-rail transfer device 96 suction-chucks the empty accommodating rails 95 on the engaging members 101, moves these empty accommodating rails 95 to the accommodation position E (described in detail below) for the spout-equipped bags, and places these empty accommodating rails 95 on carrying tables 113 and 114. At the same time, the accommodating-rail transfer device 96 suction-chucks the full accommodating rails 95a accommodating spout-equipped bags at the accommodation position E and places these full accommodating rails 95a on the engaging members 102.

The insertion device 97 is installed above the block-form rail conveying bodies 83 and fixed conveying rails 84. The insertion device 97 is comprised of a pusher 115 which pushes the spouts S that are held by the block-form rails 88 and fixed conveying rails 84 forward, an air cylinder 116 which raises and lowers the pusher 115, and a rodless cylinder 117 which moves these components in the forward-rearward direction.

The above-described accommodation position E is positioned on an extension of the fixed conveying rails 84. The front and rear ends of the accommodating rails 95 are positioned by a positioning air cylinder 118 and positioning member 119 at this accommodation position E. The spout guides of the accommodating rails 95 that are positioned in this accommodation position E are positioned on extensions of the spout guides of the fixed conveying rails 84; and the spout guides of the accommodating rails 95 are set at a different height than the spout guides of the fixed conveying rails 84, and these respective sets of spout guides overlap when viewed from above.

The full-accommodating-rail feed-out device 22 is comprised of a pair of chain conveyors 121, both ends of which being mounted on sprockets, carrying tables 122 and 123 which support both ends of the full accommodating rails 95a, and an extraction device 124 which pulls the full accommodating rails 95a placed on the edges of the carrying tables 122 and 123 as far as the chain conveyors 121. Feeding claws 125 which protrude outward are attached to the chain conveyors 121 at uniform intervals, and the feeding claws 125 move through the areas immediately to the inside of the carrying tables 122 and 123. The extraction device 124 is comprised of a pulling member 126, an air cylinder 127 which raises and lowers this pulling member 126, and a rodless cylinder 128 which moves these parts to the left and right.

The full accommodating rails 95a that are placed on the carrying tables 122 and 23 by the lowered engaging members 102 are pulled toward the chain conveyors 121 by the pulling member 126 and are then engaged by the feeding claws 125 and fed out.

The operations whereby the spouts S are transferred from the second rail device 17 to the third rail device 18, and from the third rail device 18 to the accommodating apparatus 13 for spout-equipped bags, will be described.

The spouts S fed out from the second rail device 17 pass over the fixed conveying rails 82 and enter the linear portions of the block-form rail conveying bodies 83. The transfer of the spouts S from the spout guides 71a and 71b of the fixed conveying rails 71 of the second rail device 17 to the spout guides of the fixed conveying rails 82, and the transfer of the spouts S from the spout guides of the fixed conveying rails 82 to the spout guide of the block-form rails 88, are stably performed in the same manner as described above.

In the block-form rail conveying bodies 83, the spouts S are conveyed at slight intervals. Accordingly, the number of conveyed spouts S can be accurately counted by the detection device.

Furthermore, the spouts S fed out from the block-form rail conveying bodies 83 enter the fixed conveying rails 84. The transfer of the spouts S from the spout guides of the block-form rails 88 to the spout guides of the fixed conveying rails 84 is also stably performed in the same manner as described above.

Then, when the air cylinder 94 is actuated so that the second stopper 93 advances onto the fixed conveying rails 84, the spouts S are stopped at this point and are held in a state of close contact. When the fixed conveying rails 84 become full, the spouts S accumulate in a state of close contact as far as the block-form rail conveying bodies 83. These spouts S undergo slipping with the spout guides of the block-form rails 88. The number of spouts S that pass beneath the first stopper 91 is counted by a detection device (not shown); and when this number reaches a predetermined value, the air cylinder 92 is actuated so that the first stopper 91 is lowered, and the conveying of the following spouts S is stopped at this point.

Meanwhile, in the accommodating apparatus 13 for spout-equipped bags, the empty accommodating rails 95 on the chain conveyors 98 are placed on the engaging members 101 and raised. At the end of this raising action, the spout-equipped bags are suction-chucked by the transfer suction disks 104 and transferred laterally to the accommodation position E (in this case, the full accommodating rail 95a in which spouts were accommodated in the previous accommodating operation is simultaneously transferred in the lateral direction onto the engaging members 102). Then, the spout-equipped bags are positioned at the accommodation position E.

Here, the air cylinder 116 is actuated so that the pusher 115 is lowered. At the same time, the air cylinder 94 is actuated so that the second stopper 93 is retracted, and the rodless cylinder 117 is actuated so that the pusher 115 is caused to move forward. As a result, the predetermined number of spouts S that have accumulated on the fixed conveying rails 84 and block-form rail conveying bodies 83 are pushed by the pusher 115, so that the spouts S are fed into the accommodating rail 95 and stored therein.

Then, the engaging members 101 and 102 are lowered, and the full accommodating rail 95a on the engaging members 102 is left on the carrying tables 122 and 123. The air cylinder 127 and rodless cylinder 128 are next actuated, the full accommodating rail 95a is pulled onto the chain conveyors 121 by the pulling member 126, and then the full accommodating rail 95a is fed out by the feeding claws 125.

As seen from the description above, in the rotary type transfer apparatus for spout-equipped bags according to the present invention, the transfer rotor is caused to perform a predetermined intermittent rotational operation that consists of stopping, acceleration, constant-speed rotation, deceleration and stopping, spouts are received from a working rotor that is continuously rotating at the same speed while the transfer rotor is rotating at a constant speed, and these spouts are transferred to a stopped rail type conveying apparatus while the transfer rotor is stopped. Accordingly, spout-equipped bags can be transferred at a high speed, and receiving errors tend not to occur.

Furthermore, in the conveying apparatus for spout-equipped bags of the present invention, a rotary type transfer apparatus and a rail type transfer apparatus are combined, and the rail type transfer apparatus is designed so as to be moved between an ordinary position and a retracted position at which the receiving of spouts is avoided. Accordingly, even in cases where devices on the downstream side are stopped due to trouble and some other reasons, there is no need for sudden stopping of the manufacturing apparatus for spout-equipped bags installed on the upstream side. Accordingly, the manufacture of defective products can be prevented, and the fusion of plastic to the sealing apparatus inside the manufacturing apparatus, etc. can be prevented.

What is claimed is:

1. A rotary type transfer apparatus for spout-equipped bags in which said spout-equipped bags are received from a plurality of first spout holding members which are disposed on a circumference of a working rotor that rotates continuously at a constant speed, and said spout-equipped bags are rotationally conveyed and transferred to a rail type conveying apparatus installed on a downstream side of said rotary type transfer apparatus, said rotary type transfer apparatus further comprising:

a transfer rotor which has a plurality of second spout holding members disposed on a circumference thereof, and a driving means which causes said transfer rotor to rotate intermittently at predetermined angle at a time in a predetermined cycle of stopping, acceleration, constant speed, deceleration and stopping, said driving means causing a speed of said second spout holding members during said constant-speed rotation to coincide with a speed of said first spout holding members and causes said first and second spout holding members to run side by side, wherein said second spout holding members receive said spout-equipped bags from said first spout holding members during said constant-speed rotation, and said spout-equipped bags are transferred from said second spout holding members to said rail type conveying apparatus provided on a downstream side at a predetermined stopping position of said second spout holding members.

2. The rotary type transfer apparatus for spout-equipped bags according to claim 1, wherein:

a movement path of centers of spout holding positions of said second spout holding members and a movement path of centers of spout holding positions of said first spout holding members approach each other, said transfer rotor rotates at a constant speed while said second spout holding members pass near a position of maximum proximity of said two movement paths, and both of said first and second spout holding members are provided with holding grooves and tapered surfaces, said holding grooves being oriented radially outward and holding said spouts at grooves located between flanges formed on said spouts and said tapered surfaces opening outward and being formed near entrance areas of said holding grooves; and wherein spouts of said bags which are held in said holding grooves of said first spout holding members are conveyed into said holding grooves of said second spout holding members while said transfer rotor rotates at a constant speed.

3. The rotary type transfer apparatus for spout-equipped bags according to claim 2, further comprising a push-out device which, above said holding grooves, pushes said spouts out of said holding grooves of said second spout holding members that are stopped at said stopping position by means of a pusher which advances and retracts in a radial direction of said transfer rotor, thus feeding said spouts out toward said rail type conveying apparatus.

4. The rotary type transfer apparatus according to claim 3, wherein said push-out device is provided with a safety mechanism which automatically stops a movement of said pusher toward outside in a radial direction of said transfer rotor when a resistance that exceeds a predetermined value is applied to said pusher during said movement of said pusher toward said outside.

5. The rotary type transfer apparatus for spout-equipped bags according to claim 2, wherein a guide member which conveys said spout-equipped bags from said first spout holding members to said second spout holding members is disposed between said working rotor and said transfer rotor, and said guide member is provided with a guide groove that is formed continuously from said movement path of said centers of the spout holding positions of said first spout holding members to said movement path of said centers of said spout holding positions of said second spout holding members; and wherein head portions of said spouts are inserted into said guide groove and guided along said guide groove.

6. The rotary type transfer apparatus for spout-equipped bags according to claim 5, further comprising a push-out device which, above said holding grooves, pushes said spouts out of said holding grooves of said second spout holding members that are stopped at said stopping position by means of a pusher which advances and retracts in a radial direction of said transfer rotor, thus feeding said spouts out toward said rail type conveying apparatus.

7. The rotary type transfer apparatus according to claim 6, wherein said push-out device is provided with a safety mechanism which automatically stops a movement of said pusher toward outside in a radial direction of said transfer rotor when a resistance that exceeds a predetermined value is applied to said pusher during said movement of said pusher toward said outside.

8. A conveying apparatus for spout-equipped bags comprising said rotary type transfer apparatus according to any one of claims 2 through 7 and a rail type conveying apparatus which is disposed on a downstream side of said rotary type transfer apparatus, wherein said rail type conveying apparatus is comprised of a transfer rail device that is disposed on a furthest upstream side of said rail type conveying apparatus as a part of said rail type conveying apparatus, and said transfer rail device comprises:

transfer rails which are installed so as to be oriented radially outward from a predetermined stopping position of said second spout holding members and are used to receive spouts of spout-equipped bags from said holding grooves of said spout holding members stopped at said stopping position and transfer said spouts to a following rail type conveying apparatus, and a driving means which moves said transfer rails from a position where said transfer rails are installed to a retracted position in which said rails receive no spouts.

9. The conveying apparatus for spout-equipped bags according to claim 8, wherein a plurality of grooves are formed in side surfaces of said spouts so as to be at vertically different levels, said spout holding members of said transfer rotor and spout guides provided on said transfer rails are disposed at different heights; and wherein grooves of said spouts that are held in said holding grooves of said spout holding members and grooves of said spouts into which said spout guides of said transfer rails are inserted are positioned at different heights in an vertical direction of said spouts.

10. The conveying apparatus for spout-equipped bags according to claim 9, wherein:

among pair of spout guides of said transfer rails, a spout guide that is positioned on a front side with respect to a direction of rotation afraid transfer rotor extends to a position that overlaps with a movement path of centers of spout holding positions of said spout holding members of said transfer rotor, and said transfer rails are arranged so as to swing within a horizontal plane; and wherein when spouts that are held by said spout holding members and moved are brought into contact with a spout guide that is positioned on a front side with respect to a direction of rotation of said transfer rotor, said transfer rails swing horizontally and escape from said movement path.

* * * * *